United States Patent [19]

Cullen et al.

[11] 4,438,402

[45] Mar. 20, 1984

[54] ELECTROSTATIC TRANSDUCER FOR LENGTH MEASUREMENT SYSTEM

[75] Inventors: Donald L. Cullen, Worthington; John A. Robertson, Chillicothe, both of Ohio

[73] Assignee: Autech Corporation, Columbus, Ohio

[21] Appl. No.: 277,845

[22] Filed: Jun. 26, 1981

[51] Int. Cl.³ ............................................. G01N 27/60
[52] U.S. Cl. .................................. 324/452; 324/457; 324/72
[58] Field of Search ................... 324/72, 452, 455, 457

[56] References Cited

U.S. PATENT DOCUMENTS

| 2,989,690 | 6/1961 | Cook    |         |
|-----------|--------|---------|---------|
| 3,096,478 | 7/1963 | Brown   | 324/452 |
| 3,303,419 | 2/1967 | Gith    | 324/455 |
| 3,729,675 | 4/1973 | Vosteen | 324/457 |

Primary Examiner—Michael J. Tokar
Attorney, Agent, or Firm—Cushman, Darby & Cushman

[57] ABSTRACT

A non-contacting electrostatic mark/sense length measurement gauge is used to place discrete areas of electrostatic charge at very accurately spaced intervals along a relatively moving material surface. Special construction of both the electrostatic marking and sensing transducers is employed. To compensate for expected unreliability of the mark/sense length gauge, a conventional highly reliable but less accurate contacting length gauge (such as a tachometer in rolling contact with the relatively moving material) is employed. The output from the electrostatic mark/sense length gauge and from the tachometer length gauge are combined by special electronic circuits to provide a length measurement of the passing material which is both highly accurate and reliable under all expected measurement conditions.

37 Claims, 18 Drawing Figures

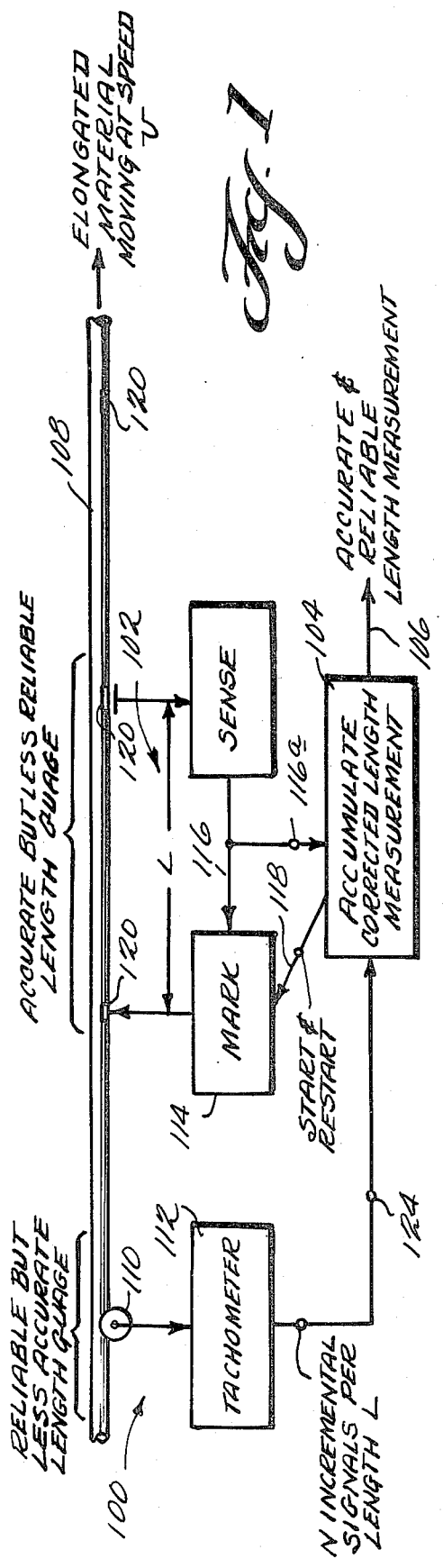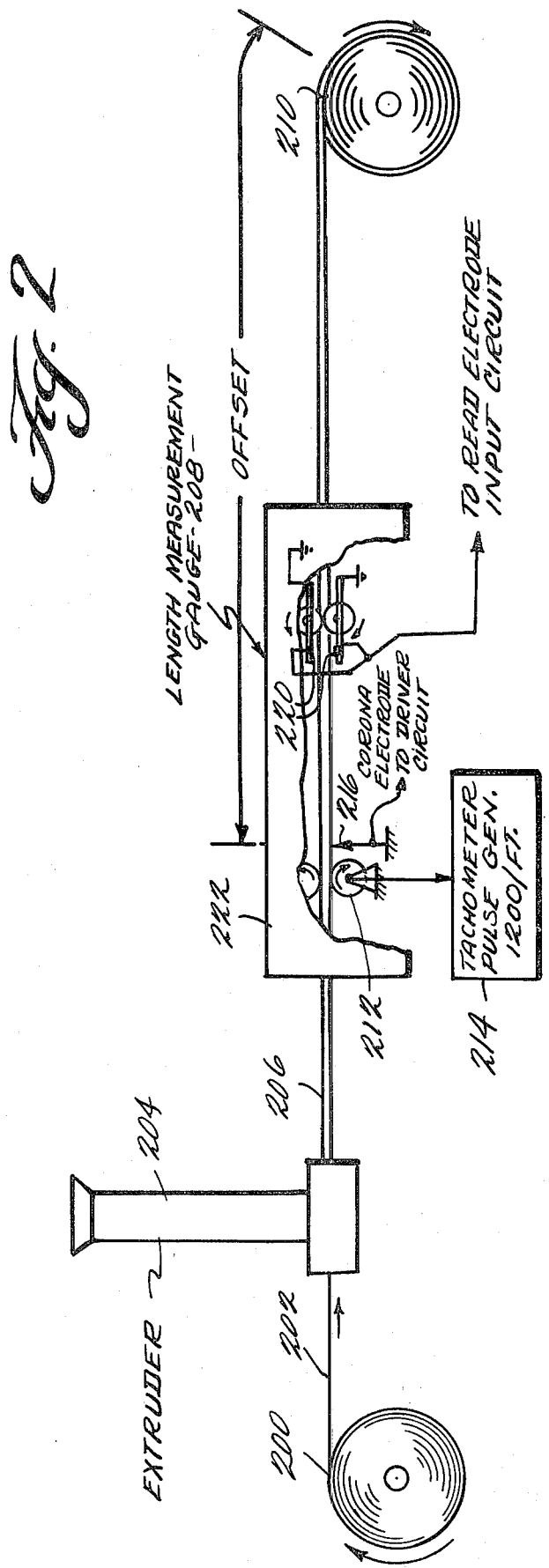

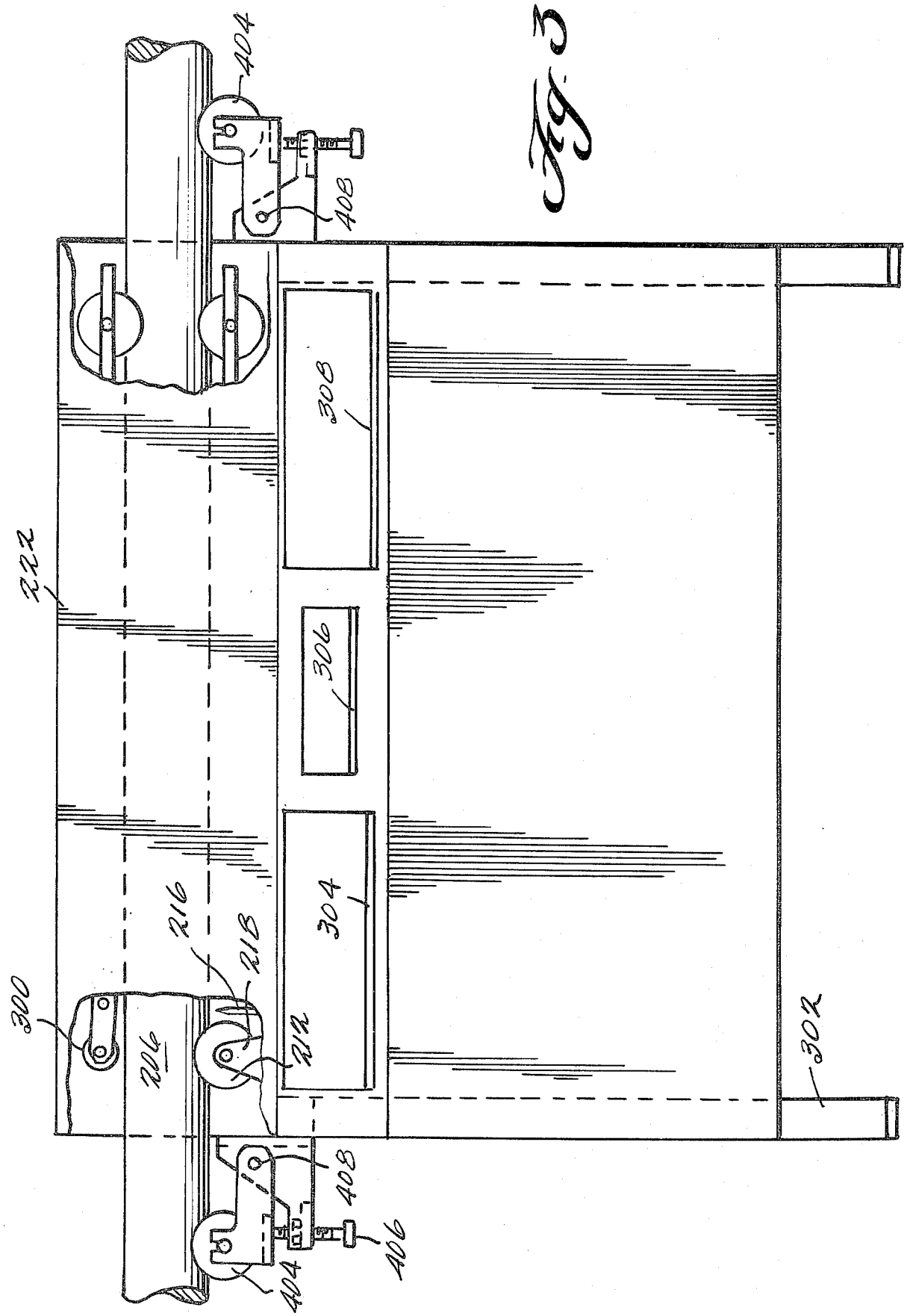

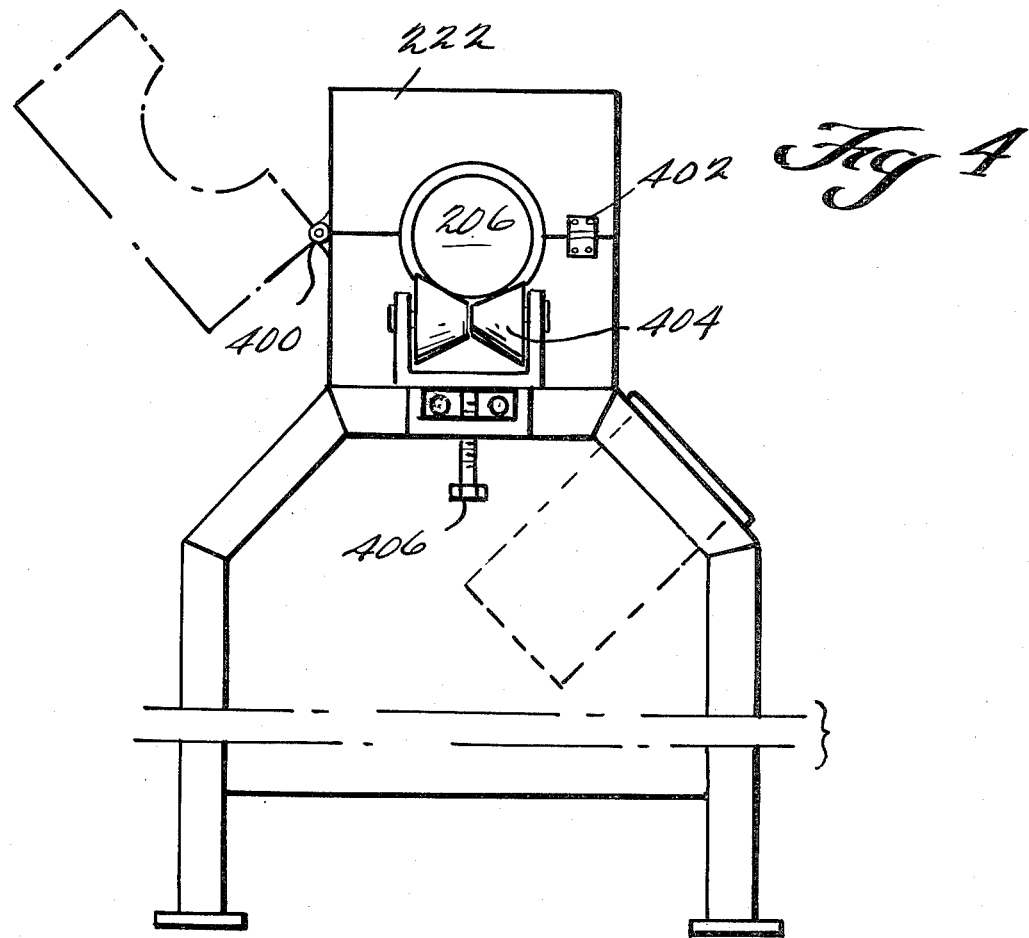
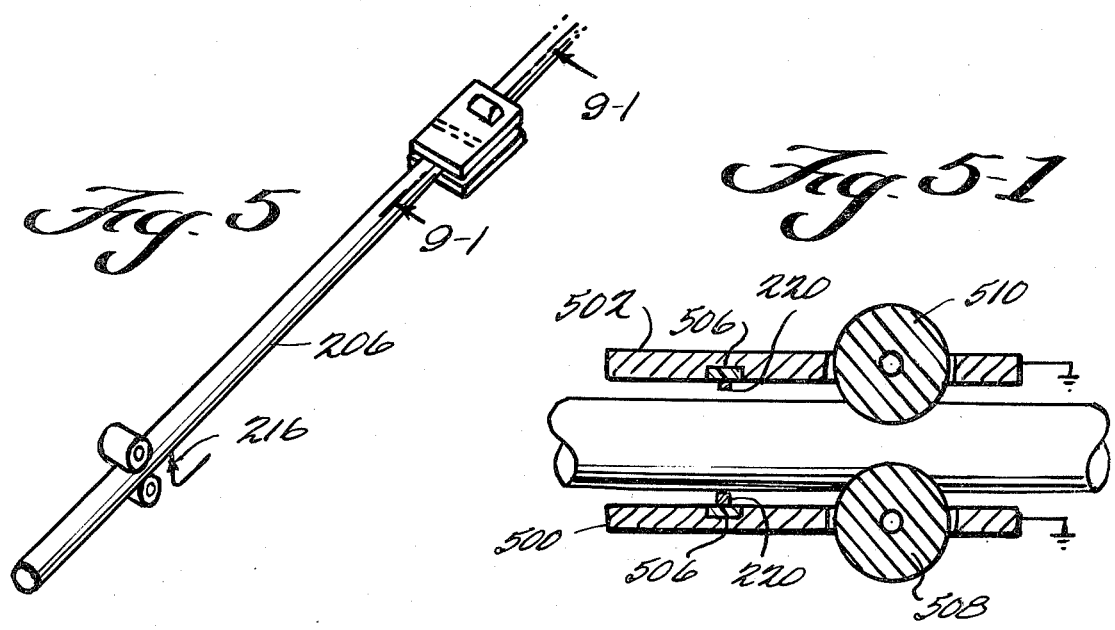

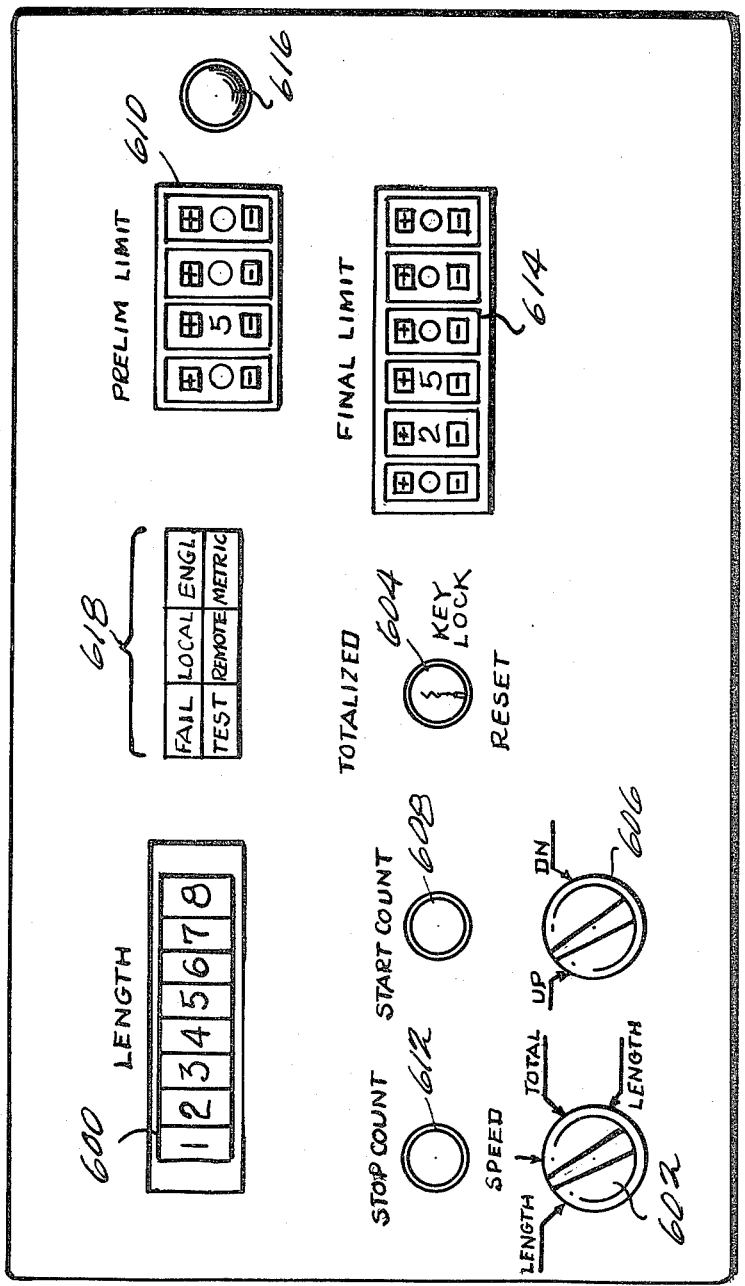
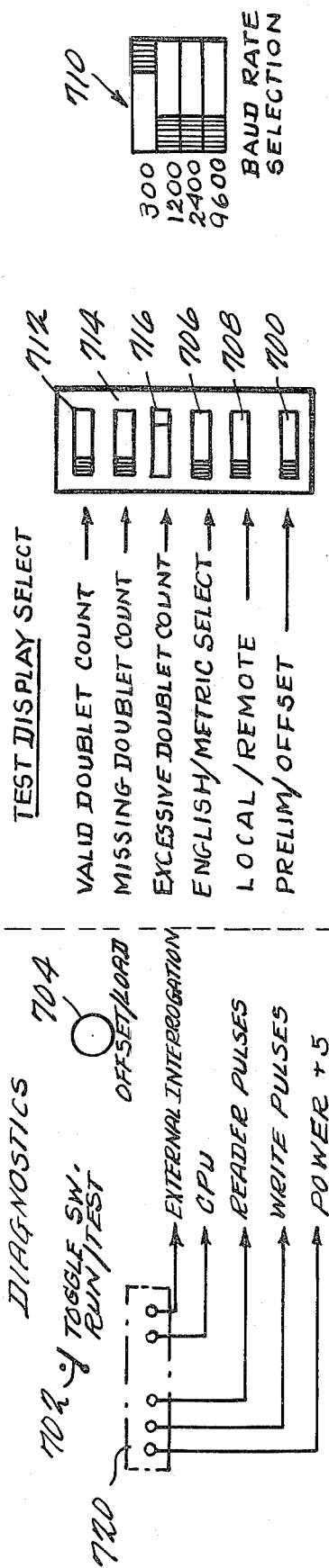

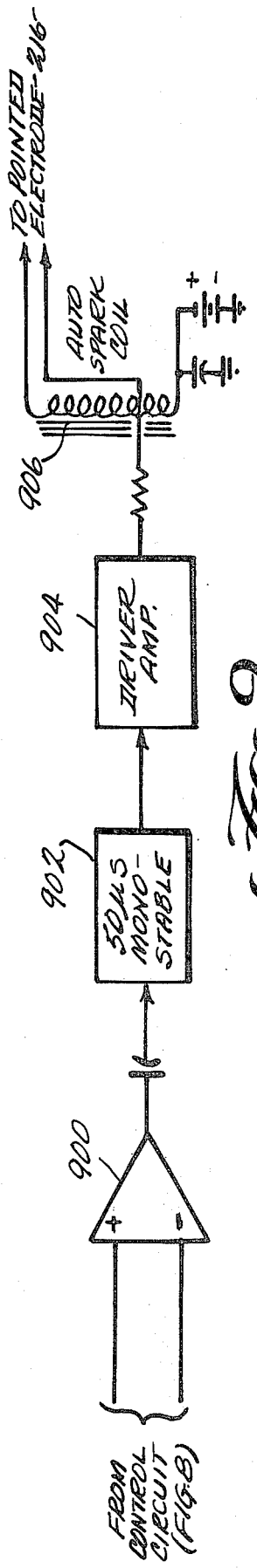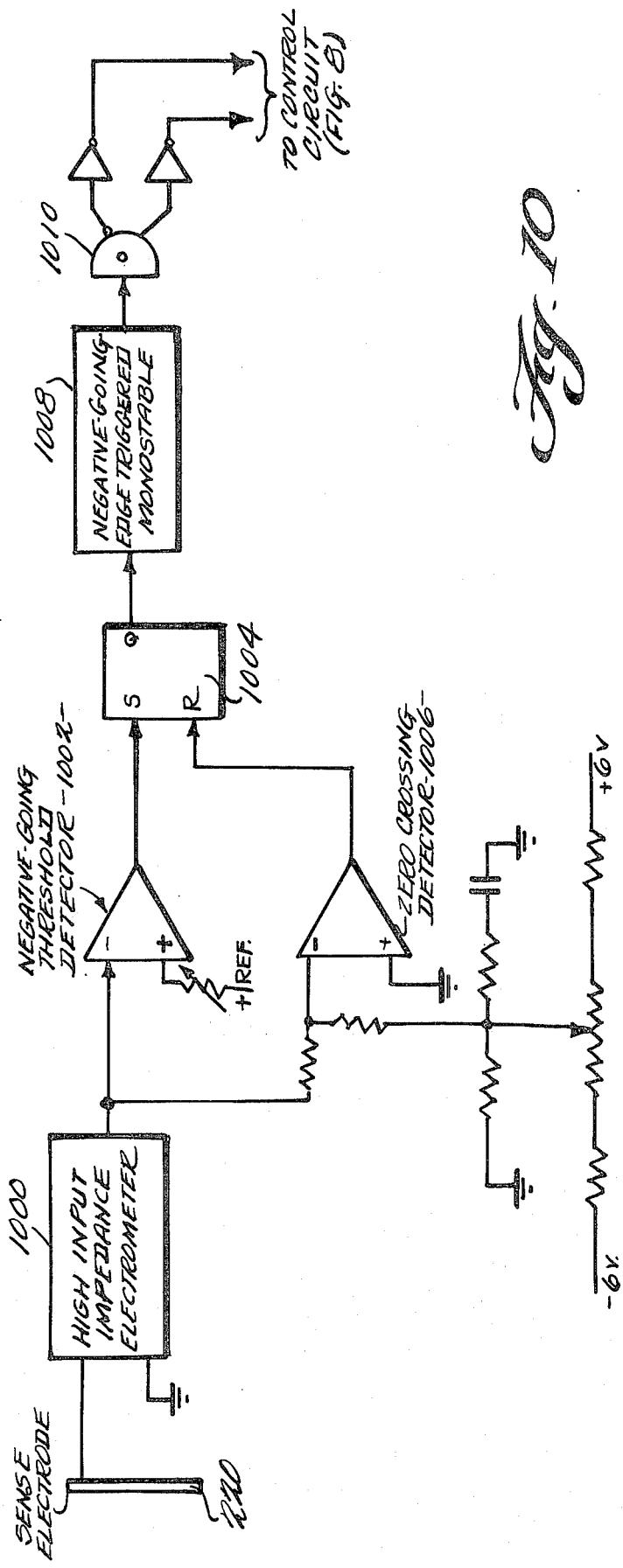

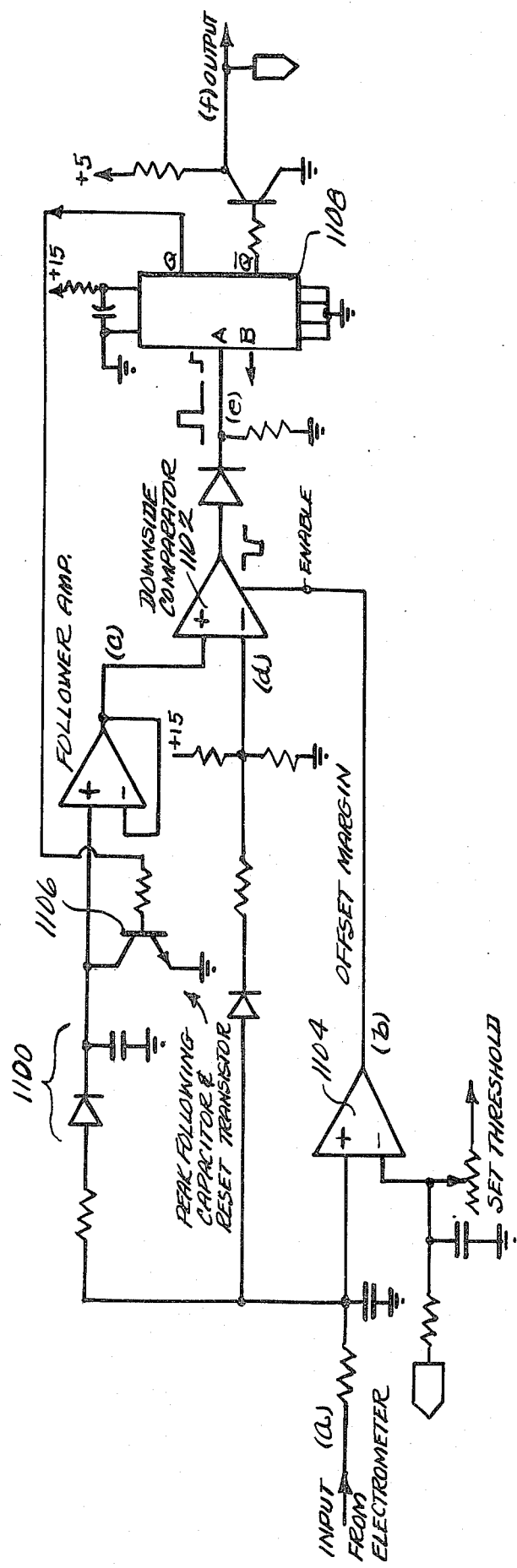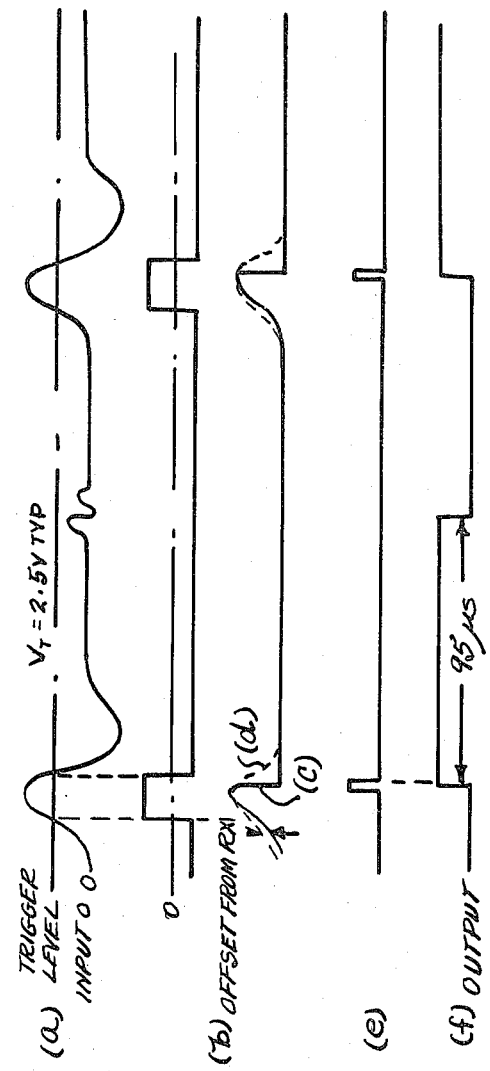
Fig. 11

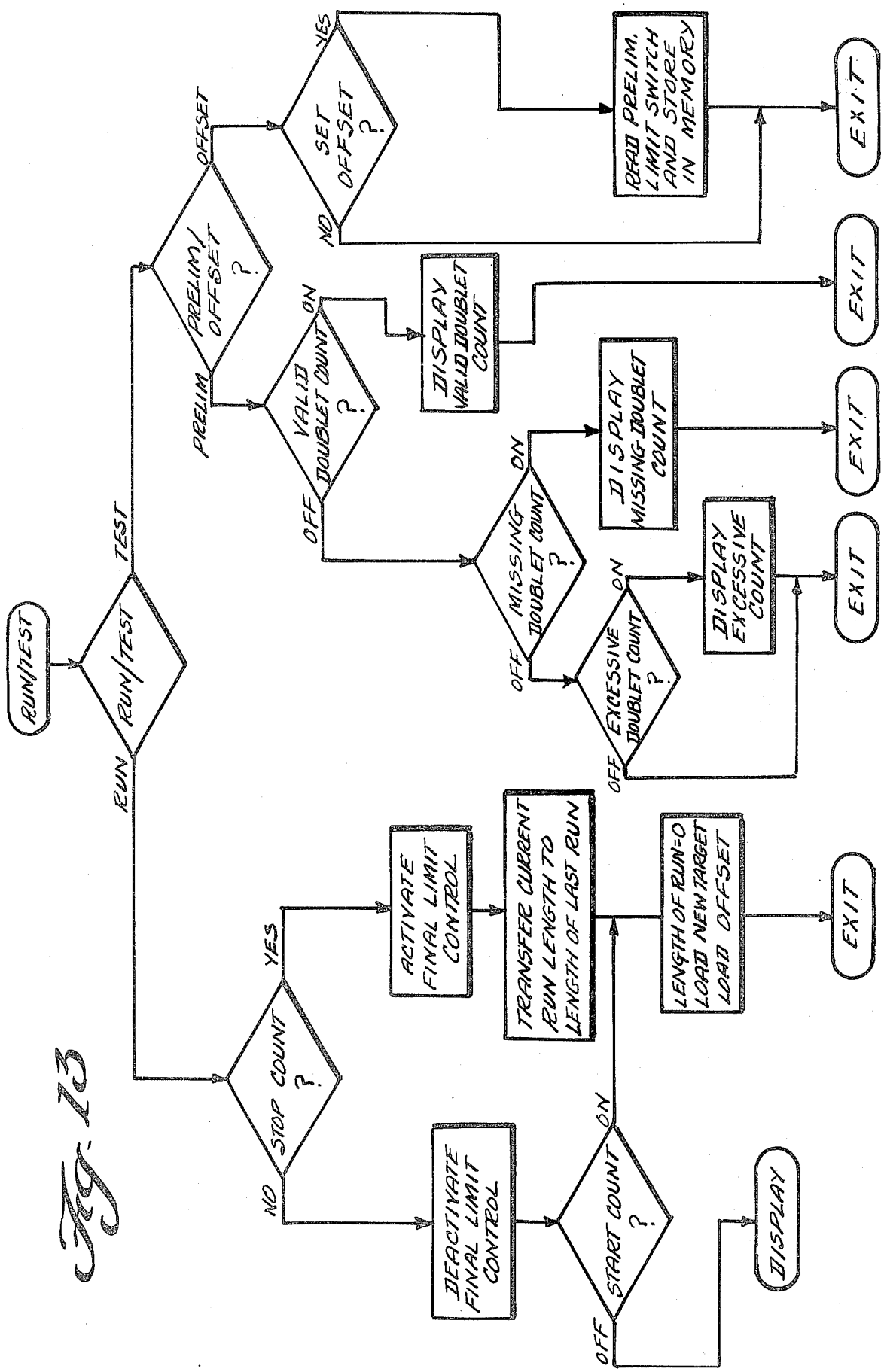

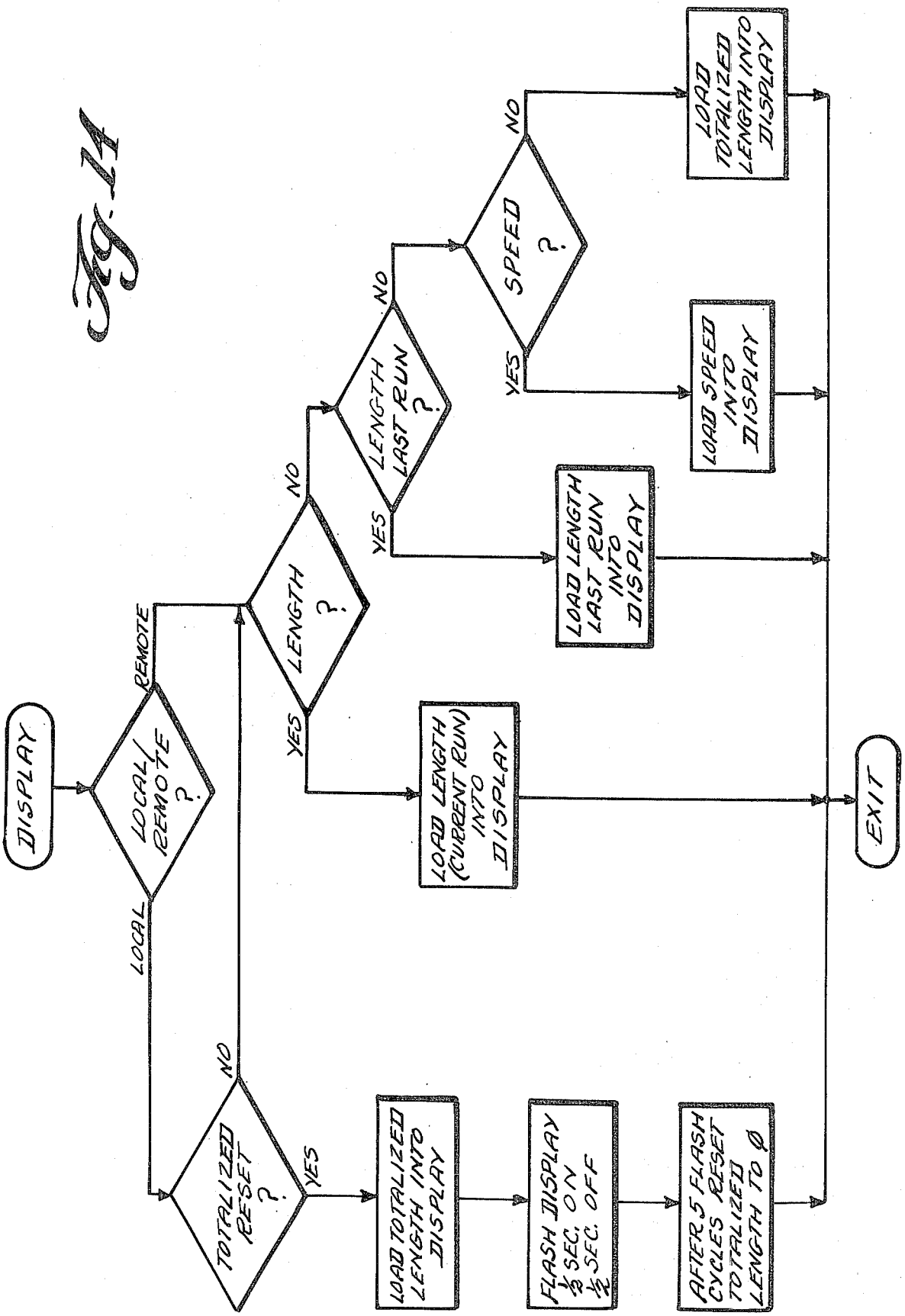

ELECTROSTATIC TRANSDUCER FOR LENGTH MEASUREMENT SYSTEM

This invention generally relates to an electrostatic transducer used in the related method and apparatus for measuring the length of elongated relatively moving material. The presently preferred exemplary embodiment is especially suited for measuring the running lengths of insulated wire during its various phases of manufacture although it is also especially suited for use in the hose, tubing and other industries as will be appreciated.

This application describes and claims the electrostatic transducers used in the presently preferred exemplary embodiment of the mark/sense length guage described herein and is related to the following copending commonly assigned applications, all filed concurrently herewith:

1. Ser. No. 277,638 naming Messrs. Cullen, Robertson and Mandalaywala as inventors and claiming the overall combination of apparatus and method employed in the exemplary embodiment of the length measurement system described herein;
2. Ser. No. 277,844, now abandoned, naming Mr. George A. Foster as inventor and claiming an improved general combination of a mark/sense length measurement gauge with non-contacting length measurement gauges based upon otherwise sensed process velocity of relatively moving material.

The requirement for accurate and reliable length measurement of relatively moving material is commonplace in many manufacturing environments. For example, in the manufacture of insulated wire products, it is necessary to accurately and reliably measure the length of manufactured insulated wire stored on a given spool, the relative location of detected defects within that length of wire and many other types of data related to the initial establishment of accurate and reliable length measurements. Such information is extremely useful, for example, when different spools of insulated single strand conductors are to be combined into multi-conductor cables and the like. Those in the art will also recognize many additional usages for this kind of information.

In general, lack of accurate and reliable length measurement data inherently results in material wastage and/or decreased productivity in many manufacturing processes. Since many of the advantages to be obtained by increased accuracy and reliability in length measurements for such manufacturing processes is generally well known and accepted or readily deduced, it is not necessary to here undertake an exhaustive explanation of these advantages. Rather, it should suffice merely to note that there are many significant economic advantages to be had by increasing the accuracy and reliability of the measurement of running lengths of a relatively moving material. Typical present day measurement accuracies on the order of 1% can often be increased by one or more orders of magnitude using this invention.

Probably the most common conventional length measurement system now in use involves a tachometer in rolling contact with relatively moving material. Such rolling contact may be had by a single roller or by pairs of opposed rollers on either side of the moving material and/or by belted drive surfaces between such rollers and the relatively moving material. The basic theory underlying these traditional length measurement gauges is relatively simple. Since the circumference of the rolling contact surface is known, and since the number of electrical pulses produced per revolution of that surface is detectable, a straight forward counting or other integration of such tachometer output pulses can be utilized to obtain a length measurement.

However, such traditional rolling contact tachometer length gauges are inherently subject to inaccuracy over the long term due, for example, to: slippage between the moving material and the driven surface; vibrations which may cause the driven surface to leave the relatively moving surface for short times; and accumulations of extraneous material or wear on the driven surface, either of which changes its circumference. Accordingly, while such traditional rolling contact tachometer gauges are extremely reliable in producing an output of some kind in response to the passage of material at any velocity, the accuracy of this output is subject to various types of error.

Mark/sense length measuring gauges are also known in the prior art. For example, such systems are taught in at least the following prior art publications:

1. "Non-Contact Measurement System for Insulating Wire and Cable Length" by Donald L. Cullen, *Wire Technology*, 9/10: 78, pages 80, 82;
2. U.S. Pat. No. 2,989,690-Cook (1961); and
3. U.S. Pat. No. 3,303,419-Gith (1967).

Mark/sense length measuring gauges use a marking transducer to place a small discrete physically detectable mark on the relatively moving surface which is later detected by a sensing transducer located downstream at a predetermined distance L. The detection of such a previously recorded mark is also used to retrigger the marking transducer and, accordingly, once started, this type of mark/sense system will continuously mark the moving material at accurately determined intervals and the number of such sensed marks can be utilized to obtain a highly accurate measure of running length.

The Cullen article, for example, describes a mark/sense type of system which utilizes a heat source to place a "heat pulse" on the passing surface. However, the heat source has a relatively limited life and the separation between the heat source and detector must be adjusted in accordance with line speed since the heat pulse deteriorates with time. The heat source also has a relatively low maximum repetition rate which requires the use of a constant trigger frequency for higher line speeds combined with a velocity-to-length conversion of the detector output for these higher line speeds. A marriage of these two different embodiments is also proposed at FIG. 5 of Cullen. Nevertheless, the system as proposed by Cullen has several deficiencies including an inability to operate at all with extremely low line speeds (e.g. where the material in the line may actually stop).

The Cook patent primarily describes a magnetic marking/sensing embodiment for use with ferromagnetic materials. It also describes a light modulation technique and an electrostatic mark/sense technique (FIG. 7). Cook's electrostatic transducers are based on capacitive effects and are in actual contact with the running length of material. In addition, all of Cook's systems would appear to be subject to many of the same types of disadvantages already noted with respect to the Cullen systems.

Gith also teaches an electrostatic mark/sense measuring system for fiber threads but with the mark/sense electrodes out of contact with the thread and the added feature of being able to switch between two different detectors located differing distances away from an electrostatic pulse marker as a function of running speed. Gith is thus similar to Cullen in recognizing that the distance between the mark and sense transducers should be varied for different line speeds where the physical mark involved deteriorates with time. Gith's system also appears to have many of the same types of disadvantages already noted with respect to Cullen.

Ideally (and as is possible in large part using the present invention), a mark/sense length measurement gauge is set up with spacing between its marking and sensing transducers so as to produce a given desired degree of accuracy. For example, if the inherent accuracy of mark definition/detection and its reproducibility is 0.050 inch and if a 0.1% accuracy is desired or required for some particular application, then it follows that the necessary separation distance between the mark/sense transducers be equal to 0.050 divided by 0.001 or 50 inches. In other words, if the inherent reproducible tolerance for marking and sensing on the surface in question is determined to have a particular value in given units of measure, then this value divided by the desired accuracy level provides the required minimum separation in that same unit of measure between the marking and sensing transducers.

It should be noted that any of the mark/sense length measurement gauges described in these prior art publications are unreliable in that if a mark is for some reason undetected (e.g. because the line stopped or slowed down significantly after the mark was applied but before it passed the detector site), the entire gauge becomes totally inoperative until restarted by some triggering mechanism. That is, since the mark transducer is triggered by the detection of a previously recorded mark, this type of chaining or hand-over-hand methodology totally breaks down once one of the links in the chain is broken. Accordingly, although capable of providing highly accurate length measurement when it is operating normally (within its limits of line speed operation, etc.), such mark/sense length gauges are undesirably unreliable and susceptible to any missed detection of previously marked sites on the moving material and/or to the spurious generation of additional detector outputs which are especially possible with the electrostatic embodiments. It is probably for these and other perhaps related reasons that such mark/sense length measurement gauges have not gained wide usage or popularity in spite of their inherent increased accuracy of measurement and in spite of the fact that they have been known per se for many years.

Now, however, the applicants have discovered method and apparatus for combining the highly reliable but relatively inaccurate rolling contact tachometer length gauge with the highly accurate but somewhat unreliable mark/sense length gauge to produce a resultant length measurement system that has increased accuracy and reliability over any previously known length measurement system.

For example, in the presently preferred exemplary embodiment, a traditional rolling contact tachometer nominally provides N (e.g. 3600) incremental signals in response to the passage of a measured length L (e.g. 36 inches) of relatively passing material. However, a mark/sense electrostatic length gauge is also employed. It comprises, for example, a pointed corona discharge electrode disposed a substantially constant distance out of contact with the intended path of the relatively moving material and a charge sensing electrode disposed some predetermined distance (e.g. L=36 inches) downstream from the corona electrode. The highly accurate output from the electrostatic length gauge is then used to correct the less accurate but more reliable output from the tachometer while, at the same time, the highly reliable tachometer output is utilized to generate a time window within which the more accurate expected electrostatic mark should be sensed. If it is not sensed within this time window, the tachometer output is utilized to automatically restart the mark/sense electrostatic gauge.

In addition, spurious outputs from the electrostatic sensor occurring at times other than during the defined window can be disregarded. Accordingly, the tachometer output is utilized to increase the reliability of the electrostatic mark/sense gauge while, in turn, the output of the mark/sense gauge is utilized to increase the accuracy of the tachometer based length measurement. The net result is a highly accurate and reliable length measurement system.

In the exemplary embodiment, this result is achieved, in part, by electrical control circuitry connected to both the mark and sense electrostatic electrodes and to the tachometer so as (1) to actuate the corona discharge electrode in response either to a detected output signal from the sensing electrode or to the counting of a predetermined number of the tachometer output signals and (2) to accumulate a length measurement of the relatively moving material as a function of the number of detected outputs from the charge sensing electrode and of the number of detected incremental signals from the tachometer.

In the preferred exemplary embodiment, the tachometer includes a roller (possibly an existing drive or idler roller) of known circumference disposed for rolling contact with the relatively moving material while the corona discharge electrode is disposed downstream of the roller on a mounting assembly that is fixed with respect to the rotational axis of the roller (which, in turn, may be fixed with respect to the overall machine frame if steps are taken to insure continuous contact between the roller and the measured surface). This arrangement ensures that the pointed corona discharge electrode is disposed a substantially constant distance away from the intended path of the relatively moving material.

In the exemplary embodiment, the charge sensing electrode and reference electrodes associated therewith may be formed in two separable parts which, when in their normal closed positions, substantially surround the intended path of the relatively moving material. When in their separated position, the material can be conveniently inserted within this electrode structure without the need to thread an open end of the material therethrough. For practical manufacturing reasons it is presently preferred to form each charge sensing element as a single linear conductor surrounded by a planar reference electrode. Preferably another planar reference electrode and sensing element is disposed symmetrically on the opposite side of the measured material. One or more rollers having their axes fixed with respect to the sensing electrode are also preferably employed just downstream of the sensing electrode so as to maintain a substantially fixed separation between the measured surface and the sensing electrode. These planar transducer elements can also be formed into mating semicylindrical shapes so as to actually entirely surround the intended path of the relatively moving material when in their closed mating position.

In the presently preferred exemplary embodiment, the material contacting roller of the tachometer and the mark/sense electrostatic electrodes are mounted within a metallic tunnel having two open ends for passage of the material therethrough along an intended path of travel. The mark/sense electrodes are separated by a fixed predetermined distance L downstream of the roller and electronic circuits are connected to the tachometer and to the electrodes for producing marking signals to the marking tranducer in response to the sensed passage of each area of previously applied electrical charge within a time window defined by counting the tachometer signals or, alternatively, in response to the expiration of that time window without the sensing of any such passage of electrical charged areas. The electronic circuit also accumulates material length measurements of magnitude L for each occurrence of such a marking signal. Tachometer signals occurring between occurrences of the marking signals are utilized so as to record incremental length measurements of magnitude L/N or some integer multiple thereof, where N is the number of tachometer signals nominally produced for each length L of material. Preferably, the metallic tunnel is separable into two parts so as to facilitate initial placement of the material thereinto and the electrostatic transducer electrodes associated therewith are also constructed so as to separate to facilitate initial material placement to the extent that they are designed to surround the intended path of the moving material when in their normal closed positions. The reference and sensing electrodes (which may surround the intended path of the moving material) may be formed from etched printed circuit board materials which can be easily formed in separable portions and conformed to a desired closed path.

These as well as other objects and advantages of the present invention will be better understood by reading the following detailed description of the presently preferred exemplary embodiment taken in conjunction with the accompanying drawings, of which:

FIG. 1 is a block diagram of the exemplary embodiment of this invention which combines a tachometer-based length gauge with a mark/sense length gauge;

FIG. 2 is a schematic block diagram of the exemplary embodiment of this invention as applied to the manufacture of insulated wire;

FIG. 3 is partially cut-away side elevation view of the presently preferred exemplary embodiment of transducer electromechanical apparatus for use with this invention;

FIG. 4 is an end elevation view of the apparatus shown in FIG. 3;

FIGS. 5 and 5-1 depict the electrostatic sensing components located within the metallic tunnel of the apparatus shown in FIGS. 3 and 4;

FIG. 6 is a pictorial depiction of an exemplary front control and display panel for use with the presently preferred exemplary electronic circuits shown in FIGS. 8–11;

FIG. 7 depicts exemplary internal switch and internal diagnostic displays for use with the panel of FIG. 6 and the circuits of FIGS. 8–11;

FIG. 9 is a schematic block diagram of exemplary driving circuitry for the corona point discharge electrode of the exemplary apparatus shown in FIGS. 3–8;

FIG. 10 is an exemplary schematic block diagram of detection circuitry for use with the electrostatic sense electrode of the exemplary system shown in FIGS. 3–9;

FIG. 11 is a schematic block diagram of detection circuitry presently preferred for use with the system of FIGS. 3–9, and FIGS. 12–17 are flow diagrams of relevant portions of an exemplary program for use in the microprocessor of FIG. 8.

Figure 8:
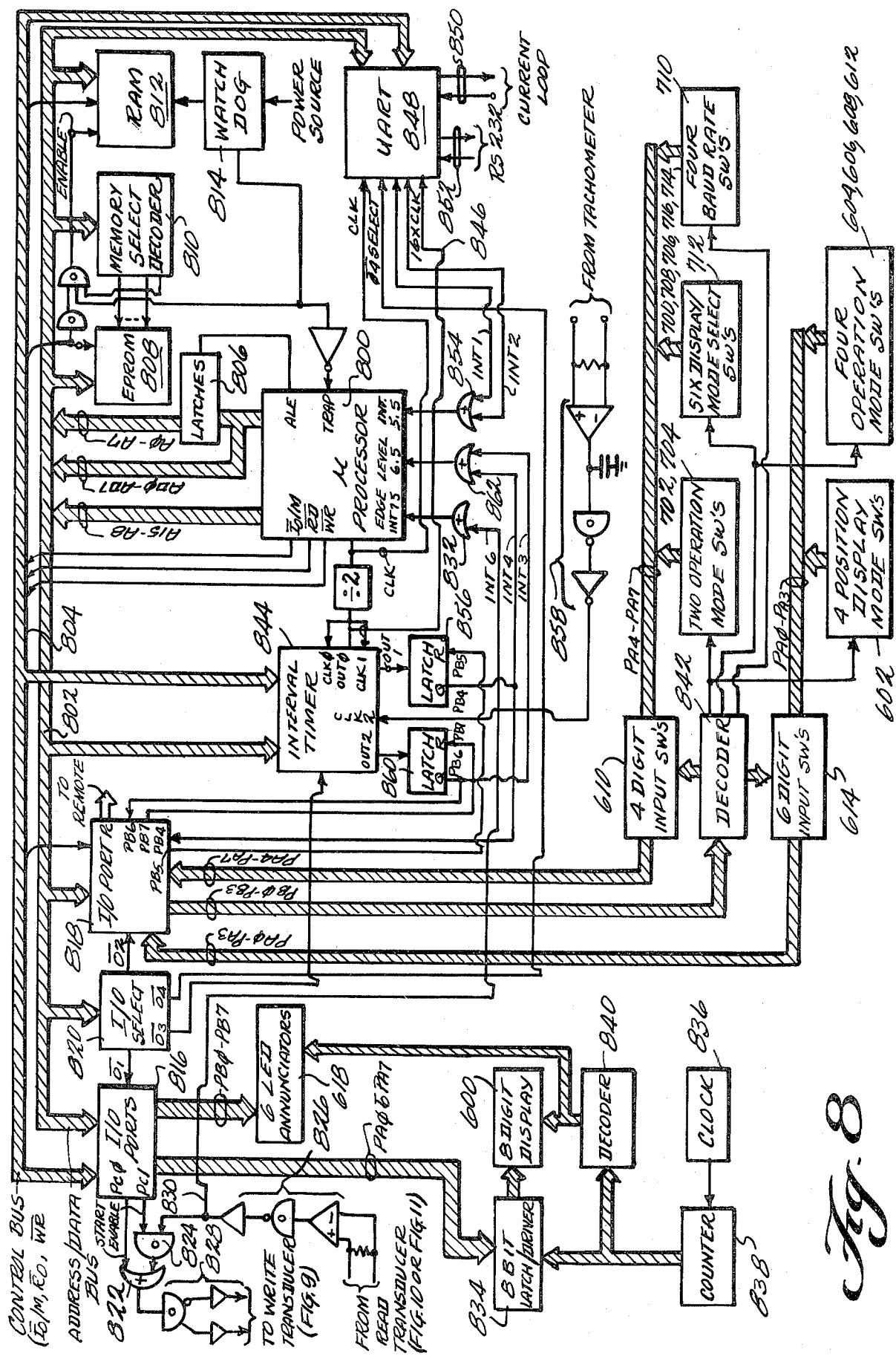
FIG. 8 is a block diagram of exemplary microprocessor based electronic control circuitry for use with the apparatus of FIGS. 3–7.

As shown in FIG. 1, a reliable but less accurate length gauge 100 is effectively combined with an accurate but less reliable length gauge 102 by electronic circuitry 104 which accumulates a corrected length measurement and provides at its output 106 an accurate and reliable length measurement of a relatively moving elongated material 108.

Gauge 100 includes a wheel 110 in rolling contact with the moving material 108. This wheel 110 has a known nominal circumference and drives a tachometer 112 which produces N incremental signals per length L. Gauge 102 includes a marking transducer 114 which, in response to an input stimulus on either line 116 or 118, applies a physically detectable mark 120. A mark sensing transducer 122 is disposed downstream a precise distance L to sense the passage of each marked area 120. As each marked area 120 is sensed, the sensing transducer circuitry 122 generates a mark triggering signal on line 116 to cause the mark transducer 114 to apply yet another mark 120. Accordingly, on line 116a, a signal will appear for each incremental length L which, when it occurs, will represent a very accurate measurement of the distance L. However, if for some reason one of the marked areas 120 is not properly sensed by the transducer 122, there will be a complete loss of signals on line 116a thereafter unless some corrective measure is taken. Accordingly, the reliability of gauge 102 is suspect in many ordinarily expected working environments.

To compensate for this potential unreliability in gauge 102, the highly reliable although less accurate output from tachometer 112 is utilized by the electronic circuitry 104 to generate a restarting signal on line 118 in the event the sense transducer 122 fails to provide a proper output signal on line 116a within a time window defined by counting minimum and maximum numbers of tachometer signals occurring since the just previous output of the sense transducer 122. In this manner, the reliability of gauge 102 is markedly improved and, at the same time, if the output of sense transducer 122 is ignored except during this predetermined time window, spurious additional outputs of sense transducer 122 will be masked thus also increasing the accuracy and reliability of gauge 102.

If the most common tachometer error tends to be caused by accumulations on the tachometer roller, then its errors will tend to be on the low side and an asymmetrical window weighted to the low side of the expected standard number of tachometer pulses is preferred. For other expected tachometer errors in particular environments, other window dispensing may be desirable.

Actually, in the preferred exemplary embodiment, the reliable but less accurate output of tachometer of 112 is utilized to accumulate incremental lengths of a magnitude L/N (or integer multiples thereof) and the occurrence of the expected output of sense transducer 122 during a time window defined by counting minimum and maximum numbers of signals from tachometer 112 is then utilized to update the accumulation of measured distance so as to insure an accumulation of magnitude L between occurrences of output signals from the sense transducer 122. The final accumulated corrected length measurement output at 106 thus has more accuracy and reliability than could be expected from either gauge 100 or 102 if operated alone.

A specific application of such an improved length measurement system is shown in FIG. 2. Here, a spool 200 of bare wire 202 is passed through an insulation extruder 204 to produce an insulated strand of wire 206. The improved length measurement gauge 208 of this invention is then employed to measure the running length of insulated wire before it is rewound on spool 210. In this manner, accurate length measurements of finished product on spool 210 can be accumulated. In addition, when used in conjunction with defect detectors and the like, accurate relative location of detected defects can be recorded as well as other important process control and/or management information related to the measurement of length.

In the exemplary embodiment shown at FIG. 2, tachometer roller 212 (possibly an existing drive or idle roller) is biased (e.g. by an upper opposed roller) into rolling contact with the moving insulated wire 206. It is also conventionally mechanically coupled to a tachometer pulse generator 214 that generates a given number of pulses for each revolution (or increment thereof) of roller 212 (e.g. 1200 pulses per foot). The output from such a pulse generator then constitutes the N incremental signals per length L appearing on line 124 in FIG. 1.

A pointed corona discharge electrode 216 (e.g. a sewing needle having an approximately 0.50 inch diameter tapering to a sharp point) is affixed to a mounting assembly 218 which is in turn fixed with respect to the rotational axis of roller 212 (both may also be fixed with respect to the overall frame of the apparatus) so as to maintain the point of the corona discharge electrode 216 at a fixed predetermined distance away from the surface of the insulated wire 206. In the preferred exemplary embodiment, this distance is on the order of 0.125–0.25 inch or more (but preferably not more than about 1 inch). Closer spacing than 0.25 inch may make the process more susceptible to "streaking" of applied charge dots or areas and also more susceptible to mechanical contact with the measured surface, require excessive control of dimensional tolerances, etc.

At a point exactly 3 feet downstream, an electrostatic charge sensing electrode 220 (e.g. possibly a ring or linear conductor having a "width" on the order of ¼ of the diameter of wire to be measured) is disposed and connected to an electrometer input so as to provide the requisite output signal on lines 116 and 116a in FIG. 1 each time a previously marked area of the insulated surface passes thereby. In the preferred exemplary embodiment, the mark/sense electrodes and tachometer roller are all mounted within a measurement tunnel 222. If the tunnel is metallic, it may itself serve as a reference or ground electrode (together with the center conductor 202 of the wire) for both the electrostatic marking electrode 216 and the electrostatic sensing electrode 220. Alternatively and/or in addition, the sense electrode 220 can be substantially surrounded or otherwise associated with one or more reference or ground electrodes so as to give the electrometer input a reference potential against which induced charge on the ring electrode 220 can be measured.

The details of mechanical apparatus (e.g. tunnel 222, tachometer roller 212, corona discharge electrode 216, mounting assembly 218, sensing electrode 220 and other related electro/mechanical details of the transducing assemblage for the presently preferred exemplary embodiment are shown in FIGS. 3, 4, 5 and 5-1.

The pointed corona discharge electrode may have either a positive or negative polarity with respect to ground or reference potential (e.g. of the wire center conductor 202 and/or of the surrounding metallic tunnel 222 or reference electrodes or the like); however, a negative charge on the pointed corona discharge electrode is preferred. Although corona occurs at a lower voltage differential for positive polarity, such corona (from Townsend electron avalanche) is initiated by free electrons remote from the tip. This is a statistical occurrence which involves some variability for short pulse lengths. A negative polarity for the pointed electrode, on the other hand, first produces field emission from the pointed tip of the electrode which does not have such statistical variabilities associated therewith. Accordingly, a more stable, predictable and thus preferred charge deposit occurs when using a pointed discharge electrode that is of a negative polarity with respect to the reference voltage.

A suitable drive circuitry for the pointed corona discharge electrode is shown in FIG. 9. Here, upon receipt of a marking signal from the control circuitry, a line driver 900 triggers a 50 microsecond monostable which, through a driver amplifier 904 excites a conventional automobile spark coil autotransformer 906 which drives the pointed corona discharge electrode 216 to a corona producing high voltage of negative potential with respect to a reference or ground voltage as shown in FIG. 9. The final stage of driver amplifier 904 may, for example, comprise a transistor type MJ10004 or a transformer coupled transistor amplifier connected to drive a high voltage coil through conventional impedance matching circuits. Much of the circuitry shown in FIG. 9 can also be realized by utilizing a conventional packaged transistorized automotive ignition system which may itself may include a suitable monostable, driver amplifier and spark coil as should be appreciated.

The electrostatic mark sensing transducer 220 works according to the known principles of electrostatic charge induction. That is, assuming a negatively charged area or dot previously applied by the marking transducer, as the charge dot moves into proximity of the sensing electrode, an opposite polarity (positive) charge is induced on the surface of the sensing electrode. If connected to an electrometer having a perfect infinite input impedance, a simple pulse output from the normal reference level output of the electrometer could be expected.

However, because actual electrometer circuits do have finite input impedances, this idealized pulse output is, in essence, differentiated so as to produce a doublet output which comprises a first pulse in one direction (at the leading edge of the expected idealized simple pulse) and a subsequent oppositegoing pulse (at the trailing edge of the expected idealized simple pulse). In between, the output of the electrometer will pass through the zero or reference level and the detection of such a zero crossing point might, for some purposes, be utilized as an approximation of the actual measurement time at which the center of the electrostatically marked area 120 actually passes beneath the center of the ring electrode 220. For example, a threshold detector could be utilized to detect the onset of the first half of each doublet by setting a flip-flop which could then be reset by detecting the next subsequent zero crossing point and the resultant set/reset transition of the flip-flop circuit output can be utilized as the signal indicating the passage of another increment L of measured length. However, in the presently preferred exemplary embodiment it has been noted that the zero-crossing does not occur until somewhat later than the actual "center" of the passing charge dot or area. Accordingly, in the preferred embodiment, special steps are taken to detect the center by detecting a point somewhat prior (in time) to the zero-crossing point.

For example, one suitable sense transducer detecting circuitry is shown in FIG. 10 for the "zero-crossing" detection embodiment. The sense electrode 220 drives a high input impedance (e.g. resistive input of approximately 20 meghoms and input capacitance of approximately 10 pf) electrometer 1000. This electrometer may have an overall voltage gain of about 20, for example, and may be realized by simply cascading two conventional operational amplifiers, the first of which is connected as a voltage follower having a high input impedance and the second of which is connected as an inverting amplifier having a gain of about 20. The output of the electrometer 1000 is a doublet as previously described because of the finite input impedance. Negative-going threshold detector 1002 then sets flip-flop or latch 1004 whenever the onset of the first half, negative-going doublet is detected. The subsequent zero crossing is then detected by the zero crossing detector 1006 to reset flip-flop 1004. The resulting negative going transition at the Q output of flip-flop 1004 is utilized to trigger a negative-going edge-triggered monostable 1008 whose output can then be conventionally coupled via a line driver 1010 to digital control circuitry as shown in FIG. 10.

The preferred detector embodiment of FIG. 11 uses the same high input impedance electrometer to drive a conventional peak follower 1100. The output of the peak follower is (after any desired level adjustment) compared to the real-time doublet signal at 1102 which is set to change state whenever the doublet signal falls a predetermined amount (e.g. 10%) from its peak value. To help eliminate spurious detections, comparator 1104 compares the doublet signal to a preset level (e.g. 1 volt) and enables comparator 1102 (only if that level exists) to trigger monostable 1108 (which also resets the peak follower via transistor 1106). Operation of the monostable and subsequent circuits is the same as already described for the circuit of FIG. 10.

The electrostatic mark/sense gauge of the exemplary embodiment is fully operative only at higher line speeds. For example, because the surface conductivity of the insulated wire 206 is imperfect (and actually varies according to surface moisture, surfactants, etc.), the applied electrostatic charge will gradually diffuse over the surface or otherwise be disseminated so as to no longer present a well defined area or dot of electrostatic charge which can be reliably sensed by the sense electrode. Furthermore, if the center conductor 202 of the insulated wire is not referenced to ground or another reference potential, common mode noise signals may be generated that give rise to spurious mark sensor detector outputs. Such common mode noise is especially noticeable if the wire is permitted to flex within the vicinity of the sense electrode so as to depart from its intended path of travel. Accordingly, the preferred exemplary embodiment includes physical positioning elements which attempt to keep the traveling material centered within the length measurement system or otherwise fixed relative to the electrostatic transducing electrodes.

It is not necessary for the charge induction sensing electrode 220 to actually literally completely surround (i.e., in a closed path) the intended path of the material to be measured and for practical manufacturing reasons it is not presently done although the presently preferred embodiment does substantially surround the intended path of travel as will be seen. However, it may for some cases be preferred. Firstly, it is conceivable that over the distance L between the marking transducer and the sensing transducer, the material may rotate through some angle thus causing an angular misalignment between a sensing electrode and the mark to be sensed unless the sensing electrode substantially surrounds the surface of the material to be measured. Secondly, and somewhat related, it may be preferred to substantially surround the wire with a sense electrode so as to maximize signal strength and minimize common mode noise problems and the like. The detector tunnel 222 should also preferably completely encompass the charge deposition and sensing electrodes so as to minimize external noise pickup.

It is preferred that the pointed end of the corona discharge electrode 216 be about 0.25 inch away from the insulation surface for smoother charge deposition. It is also preferred that the wire surface not be backed up by a roller or the like directly at the corona discharge electrode (or at any point downstream thereof until just past the sensing electrode) since it has been observed that such a roller may make the charge deposition/sensing process erratic (possibly due to charge transfer occurring about the wire surface under influence of the contact with the roller).

As earlier mentioned, it is also preferred to minimize the flexing of the material surface (especially at the electrostatic electrode sites). Preferably, support rollers in both the horizontal and vertical directions for the wire or other material to be measured be provided just before the charge deposition electrode and just after the charge sensing electrode so as to minimize oscillations or flexing of the material surface at these critical points.

The material surface should preferably be dry and to help insure this condition, one or more air wipes (possibly including a hot air blast) should be provided somewhere near the entrance to the measurement tunnel. In the exemplary embodiment of FIG. 2 where insulated wire lengths are being measured, it has also been found important to keep the wire core 202 at a controlled reference or ground potential. For example, capstan tension rollers or the like directly in contact with the bare center conductor 202 can be utilized to ground the center conductor to a reference potential.

As shown in FIGS. 4 and 5, the tunnel 222 is preferably formed in two separable portions that are hingedly connected at 400 so that the tunnel may be opened to permit easy entry of the insulated wire 206 without the need to thread an open end thereof through the tunnel. To maintain the tunnel in its normal closed position, a latch (e.g. magnetic as shown in FIG. 4) 402 is preferably employed.

Self-centering rollers 404 are employed on either end of tunnel 222 to automatically keep the insulated wire 206 centered horizontally within the tunnel. Vertical adjustments of these self-centering rollers may be made through adjustment screws 406 which rotate the rollers 404 about a mounting hinge point 408.

Occasionally during wire manufacturing processes, a knot or other oversize section of material will be presented to the length measurement system. Accordingly, an automatic opener for tunnel 222 is provided in the form of a roller 300 mounted in the upper portion of the hinged tunnel assembly. Whenever an oversized section of material presents itself, it will contact the roller 300 and automatically force the tunnel 222 to separate at its magnetic latch 402 and to open by rotation around hinge 400 so as to thus harmlessly open the tunnel rather than to risk permanent damage by the oversized section of material. Roller 300 may also be used to bias the wire into contact with the tachometer roller.

The tunnel 222 is preferably formed of a conductive material (e.g. steel) and the whole assemblage is mounted upon a steel stand or housing 302 designed to place the tunnel assembly 222 at approximately the correct vertical height above the floor of a manufacturing facility for the particular product whose length is to be measured. The frame 302 may also include, for example, associated self-contained components 304, 306, 308 such as the electrical control and display panel and chassis (shown as dotted lines at FIG. 4), a model identification plate or the like, a power supply unit, etc. as should be appreciated.

The sense electrodes 220 and surrounding reference electrodes may, if desired be formed from printed circuit board materials using printed circuit construction techniques. These electrodes may be formed in two separable pieces, as shown, corresponding to the separable pieces of the tunnel 222. They may also be physically conformed into approximately semicylindrical corresponding sections if desired. The printed circuit conductive area may be selectively etched away on either side of the sense electrode 220. Thus, when the tunnel 222 is in its closed position, a substantially encompassing sense electrode 220 is defined. Similarly, the rather larger conductive areas remaining on either side of the sense electrode 220 form reference electrodes. (When the tunnel 222 is in its normally closed position, these reference electrodes may also be of substantially cylindrical shape albeit of considerably longer axial dimension than is the sense electrode 220). The reference electrodes are electrically connected in parallel to a ground or reference potential (e.g. as is the metallic tunnel 222, the housing 302, the center conductor of the wire 202, etc.). The two halves of the sense electrode 220 are electrically connected in parallel to the input of the sense detector circuits shown in FIG. 10.

The presently preferred embodiment of the electrostatic transducer is shown at FIGS. 5 and 5-1. It includes two large horizontal conductive plates 500, 502 (e.g. about one foot square) which are used as reference electrodes for the electrometer input. A narrow (e.g. 0.125 inch) linear sense electrode 220 is formed within or on top of a surrounding cut or etched area 506 filled with an insulating material in the reference electrodes 500 and 502. The lower plate is preferably fixed (at least during normal length-measuring operations) with respect to the axis of a downstream (e.g. a few inches) roller 508 (disposed within an aperture of electrode 500) so as to accurately space (e.g. by 0.125 inch) the sense electrode 220 from the measured surface which is, in turn, biased (e.g. by weight or opposed roller 510, etc.) into contact with roller 508. The whole assembly is preferably housed in metallic tunnel 222.

Although completely hard wired special purpose electronic control circuitry could be used to implement this invention, the presently preferred exemplary embodiment comprises a microprocessor based system of electronic control circuitry as will now be described in conjunction with FIGS. 6–8.

The front panel of operator controls and displays is shown in FIG. 6 for the preferred exemplary embodiment. An eight digit numeric display 600 is utilized for displaying the data stored in various memory circuit registers as selected by the display selection control 602. For example, the running length measured during a given measurement run can be displayed, the speed (in either feet or meters per minute) can be displayed, the actual total length measured in all measurement runs since last actuation of the key-operated reset switch 604 can be displayed or the length of the last measurement run can be recalled and displayed. Furthermore, switch 606 permits the running length measurement to be displayed in either an up-counting or down-counting mode (from a preset final limit length) as the operator may prefer for given applications.

A given measurement run is initiated by operator actuation of the start count switch 608 which automatically adds (or subtracts in the down-count mode) a preset "offset" length (input via the "preliminary limit" rotary thumbwheel switches 610 as explained hereafter) to the running length register. (The preset offset distance may represent, for example, a fixed starting length labeled "offset" in FIG. 2.) The running length is then displayed at 600 (in either up- or down-counting mode as selected by the operator) until the operator actuates the stop count switch 612 which acts to reset the running length register and therefore the display 600 to zero.

To give the operator some advance warning of the impending end of a measurement run, a "preliminary limit" distance is entered via thumbwheel switches 610. The final limit of a given measurement run is entered via thumbwheel switches 614. As the running length measurement comes within the preset preliminary limit of the final limit, a light indicator 616 is lit so that automatic or operator initiated steps can be taken to slow down the line, cut the wire, mark the wire or otherwise bring the measurement run to its desired conclusion at the preset final limit. The stop count switch 612 is actuated before beginning a new measurement run.

The offset amount entered via the preliminary limit thumbwheel switches 610 is added (or subtracted for down-counting mode) to the running length register whenever the start count switch 608 is actuated. It represents the length of material between the actual start point of the length measurement system and a takeup spool or the like which has effectively already passed through the length measurement system at the initiation of a measurement run. This will often be a fixed number for a given wire manufacturing line or for any given related sequence of measurement runs. Accordingly, it is normally entered by actuation of a relatively inaccessable (e.g. accessible behind the front panel) switch 700 shown in FIG. 7. If switch 700 is switched to the "on" position and if toggle switch 702 is placed in the "test" condition, the number entered into the preliminary limit thumbwheel switches 610 can be loaded into the offset register in memory circuits by actuation of the load offset push button 704 shown in FIG. 7.

The mode lights 618 shown in FIG. 6 are simply for the purpose of reminding the operator as to the current modes of operation. For example, operation can be in either English or metric units as selected via switch 706 in FIG. 7. The appropriate mode light 618 will reveal the current selection to the operator at all times. The local/remote operation mode is similarly selected via switch 708 and displayed via the appropriate mode light 618 should be apparent. (Remote mode is used only when the unit is being remotely controlled over a data communication channel. For example, the totalized reset, start count, reset count, preliminary limit, final limit and offset data and/or control functions can be entered from a remote point if desired and all normally available output data can be transmitted to a remote site on request as will be discussed in connection with FIG. 8.) The failure mode light 618 will be lit if for some reason there is no sensed tachometer input but there is continuing input from the mark/sense length gauge. Since, in the exemplary embodiment, length measurement depends on reliable tachometer inputs, this condition would indicate a failure mode. The test mode light 618 is energized whenever toggle switch 702 is placed in the test mode. As shown in FIG. 7, switches 710 can be utilized for selecting the desired baud rate for communication to/from a remote control unit.

In addition to the registers of accumulated lengthrelated data already discussed, the preferred exemplary embodiment maintains three additional registers of accumulated data in its memory circuits:

1. the number of detected electrostatic pulses (i.e. doublet signals from the electrometer) which occur within an expected time window defined by counting tachometer pulses during the just previous complete measurement run;
2. the number of missing doublet signals (i.e. the number of time windows in which no expected doublet is detected) during the just previous complete measurement run; and
3. an excessive doublet count (i.e. all detected doublets occuring outside expected time window) for the last complete measurement cycle.

These three registers containing data representing the valid, missing and excessive doublet counts are selectable for display in the test mode (entered via toggle switch 702) via switches 712, 714 and 716, respectively.

At least five diagnostic lights are also provided in the preferred exemplary embodiment as shown in FIG. 7. These may be in the form of light emitting diodes, for example, and relate to various instanteous ongoing statuses of the equipment to aid in diagnosing and trouble shooting of the system.

The presently preferred exemplary embodiment of microprocessor based electronic circuitry for use in the exemplary length measurement system is shown at FIG. 8. The basic overall architecture of the microprocessor system shown in FIG. 8 is fairly typical in that it includes a microprocessor 800 (e.g. Intel 8085) connected to various outboard memory chips and input/output ports via address/data bus 802 and control bus 804. Typically, the eight least significant bits of the address are latched with address latches 806 (e.g. latch type 8282) so as to permit these same lines AD∅-AD7 to carry an eight bit data word onto the address/data bus 802 without losing the eight bits of address information previously transferred to the latches 806. The EPROM 808 comprises several separate sections (e.g. four Intel 2716 circuits each providing 2,000 words of memory) and a memory select decoder 810 (e.g. Intel 3205) is utilized to permit selection of particular sections of the EPROM 808 as should be apparent to those familiar with microprocessor based circuits. The random access memory is preferably a CMOS type of memory (e.g. two Harris type 6514 circuits providing a total of 1,000 words of memory) which is utilized with a conventional "watch dog" memory protection circuit 814 to trap desired data in the RAM 812 in the event of power failures or the like, thus making the RAM 812 a relatively non-volatile memory unless, of course, the internal nickel cadmium battery source for the watch dog memory protection circuit itself somehow becomes discharged. The read and write enablement of EPROM 808 and RAM 812 should be substantially self explanatory to those in the art from FIG. 8.

The various input switches and output displays depicted in FIGS. 6 and 7 are controlled and accessed by microprocessor 800 through I/O ports 816 and 818 (e.g. two Intel 8255 circuits providing three eight bit I/O ports each) and an I/O select decoder 820 (e.g. Intel 3205). As shown at FIG. 8, the two least significant digits of port PC in I/O 816 are utilized to provide "start" and "enable" signals respectively to OR gate 822 and to AND gate 824. When the read transducer of FIG. 10 detects a proper doublet signal, it will be coupled via traditional line termination circuitry 826 to another input of AND gate 824. If the enable signal is also present (during an expected time window determined by counting tachometer input signals as will be later described), this signal is automatically passed through gates 822 and 824 and conventional line driving circuitry 828 to trigger the marking transducer circuitry shown in FIG. 9. That is, if a doublet is detected within its expected time window, it will automatically retrigger the marking transducer without the need for further information processing by microprocessor 800. Accordingly, no significant data processing delay is encountered in retriggering the marking transducer and thus the inherent accuracy of the mark/sense length gauge is maintained.

At the same time, successful detection of a doublet causes a signal to be passed over line 830 to the INT6 interrupt which, through OR gate 832 is connected to edge interrupt 7.5 of microprocessor 800. In this manner, the microprocessor is interrupted by the occurrence of any detected doublet (whether within or without the expected time window) and, under progam control described hereafter, causes appropriate data registers in the memory circuits to be updated.

The start signal input to OR gate 822 is generated by microprocessor 800 under program control upon activation of the start count switch 608 already described.

Port PA of I/O port 816 is used to drive the eight digit display 600 via a conventional eight bit latch/driver 834 (e.g. two integrated circuit type 74LS170). The display 600 is asynchronously updated via clock 836 which drives counter 838. The output of the counter is used to address the latch/driver 834 and also to drive decoder 840 which, in turn, addresses the eight digit display 600. The output of the decoder 840 is also used to address six LED annunciators 618 (i.e. the six mode lights shown in FIG. 6) and the data used to determine the status of these annunciators is provided via port PB of I/O port 816.

The lower four digits of port PA in I/O port 818 are utilized to receive input data from the six digit thumbwheel switches 614, the display mode switches 602 or the various operational switches 604, 606, 608 and 612. Selection of these various switches (e.g. via diode gates) is controlled by decoder 842 (e.g. Intel 3205) which is driven by the lower four digits of port PB of I/O 818.

The higher order four digits of port PA in I/O 818 are utilized for receiving data from the four digit thumbwheel switches 610, the operational mode switches 702, 704; the test display/mode select switches 700, 706, 708, 712, 714, 716 and/or the baud rate select switches 710. Again, activation (e.g. via diode gates) of particular ones of these switches for use at any given time is achieved through decoder 842 driven by the lower order four digits of port PB in I/O port 818.

A three-section programmable interval timer 844 (e.g. PIT 8253) is utilized for three separate functions. The first section is connected to receive a clock signal from microprocessor 800 (actually divided by two) and to provide an output clock on line 846 that has a rate equal to 16 times the baud rate selected at switches 710. This and the undivided clock frequency signal from microprocessor 800 together with an appropriate select signal from decoder 820 are all input to UART 848. The purpose of UART 848 is its conventional function of converting parallel data to serial form or vice versa. The serial data may appear in either input or output form on lines 850 in EIA standard RS232 format or on lines 852 in a conventional 20 milliampere current loop format. UART 848 is also connected to the INT 1 and INT 2 terminals which, through OR gate 854 provide a level interrupt 5.5 to microprocessor 800. As will be understood by those skilled in the art of microprocessor circuitry, such interrupt signals are utilized to properly coordinate the parallel/serial and serial/parallel conversion processes of UART 848 under appropriate program control of microprocessor 800. This remote input/output ability may be used to realize the remote control functions earlier discussed.

The second section of the programmable interval timer 844 is utilized as a simple 1-second timer for purposes of calculating speed data for the measured material. In particular, the frequency divided clock signals from microprocessor 800 are input to the CLK1 clock terminal and an output is used to set the latch 856. The Q output of latch 856 is made available to the microprocessor 800 via the PB4 terminal of I/O port 818 while the latch 856 can be reset by microprocessor 800 via port PB5 of I/O port 818. The number of incoming tachometer pulses are counted during each successive 1-second interval, as defined by the second section of the programmable interval timer, and a speed calculation in either feet or meters per minute is then made by microprocessor 800 and the appropriate speed register is updated for selective display under operator control as should now be apparent.

A conventional tachometer (e.g. Accu-Coder model 711 manufactured by Encoder Products Co.) is utilized to provide a predetermined nominal number of pulses per increment of measured length (e.g. 3600 for 36 inches). This conventional tachometer train of input pulses is input via a conventional line termination 858 to the clock terminal CLK2 of the third section of the programmable interval timer 844. The output of this third section timer is then used to set latch 860. The Q output of latch 860 is made available to microprocessor 800 via port PB6 of I/O port 818 while latch 860 can be reset by the microprocessor 800 via port PB7 of I/O port 818. It should be recognized that this third section of the interval timer can be programmed, for example, to count any desired number of input tachometer pulses before providing an output pulse at terminal OUT2. In the preferred embodiment, 120 pulses are nominally counted between outputs but that number can be modified so as to correct for detected tachometer inaccuracies.

It should also be noted in FIG. 8 that the Q output of latch 856 is connected to the INT4 terminal and the Q output of latch 860 is connected to the INT3 input terminal of OR gate 862. This gate output is, in turn, connected to the 6.5 level interrupt of microprocessor 800. Accordingly, any time either latch 856 or latch 860 is set by its respective section of the interval timer 844, the microprocessor 800 is interrupted and via the appropriate connection of I/O port 818 is able to determine which one or both of the latches has been set and to take appropriate programmed action in response thereto.

The final eight digit port PC of I/O port 818 is utilized to drive remote indicator relays, the LED diagnostic annunciators 720, the preliminary limit light 616, wire cutting equipment, or any other desired external input/output devices.

If desired, plural charge detecting sensors can be selectively used at different separation spacings from the corona discharge electrode to control accuracy levels and/or to better accomodate different speed ranges. As should now be appreciated, the mark/sense length gauge of this invention can be used even when the material is sometimes slowed or stopped so that the last-applied charge dot "disappears" before reaching the sense electrode. This is because it will automatically be re-started by the tachometer input. Of course this mark/sense guage will for the same reason initially be automatically self-starting.

Figure 12:
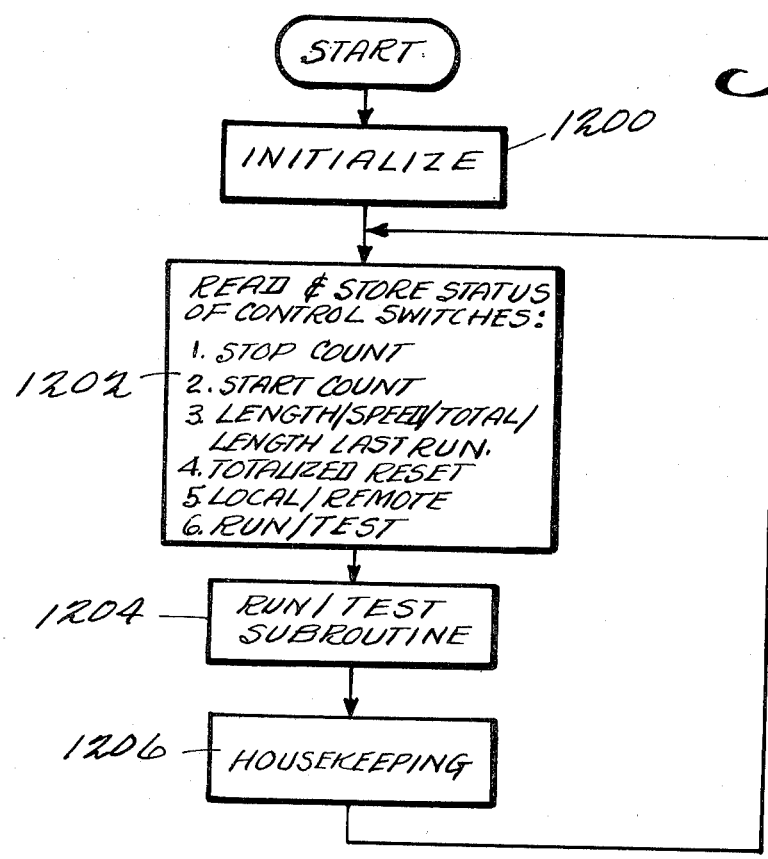

An exemplary microprocessor program is depicted by the flow charts in inter-related FIGS. 12-17. The basic executive routine is shown in FIG. 12. There, upon start up, all data registers, flags, displays etc. are initialized to appropriate starting values. Then the circuit statuses of the various operator controlled switches are read and stored at 1202 using the I/O ports 816 and 818, the RAM 812 etc. as should be apparent to those skilled in the art. Then, at 1204 the RUN/TEST subroutine is entered (FIGS. 13-14). Return is via the "housekeeping" block 1206 before another cycle of the executive routine is entered as shown. The "housekeeping" block encompasses typical conventional processes performed in microprocessor-based systems of this type. For example, various I/O subroutines controlling communication with a remote site via UART 848, data saving transfers to CMOS RAM 812 in the event of impending power failure, activation of appropriate annunciator lamps, remote elays or lights, setting of baud rate clock counter etc.

Of course at any real time of occurrence, any of the interrupts INT1, INT2, INT3, INT4 or INT6 can occur in which case the ongoing programmed processes of FIGS. 12-14 are temporarily interrupted in favor of other programmed higher priority processes. The interrupt subroutines for INT3, INT4 and INT6 are explicitly depicted at FIGS. 15-17 respectively, INT1 and INT2 are conventional subroutines used to interface with UART 848 and are therefore not shown explicitly.

If the "test" mode is entered via the RUN/TEST subroutine, various doublet counts may be selectively displayed or offset input data may be received and stored as shown in FIG. 13. In the normal "run" mode, the "start" and "stop" switch statuses are checked before entering the DISPLAY subroutine. As shown in FIG. 13, if either of these pushbutton switches is "on", special actions are taken with respect to the final limit control (e.g. energize a cutting or marking relay, etc.) and to the data registers used to store current and last run length. New final limit target and offset data may also be entered into appropriate registers.

The DISPLAY subroutine of FIG. 14 is entered from the RUN/TEST subroutine as just explained and causes an appropriate display on the front panel. If a "count down" mode of display is desired, an appropriate conversion can here be made for display purposes as will be apparent.

Figure 15:
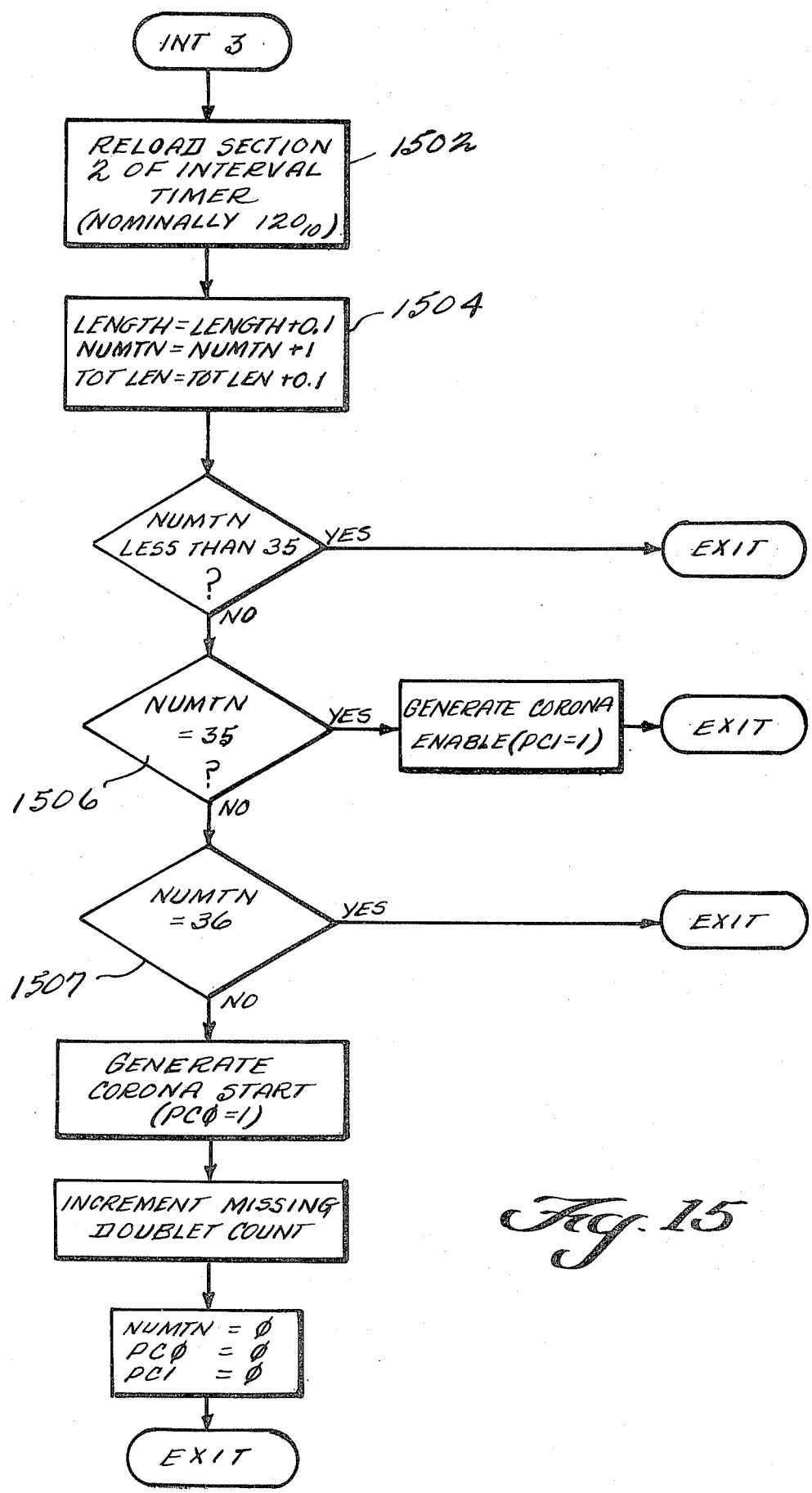

Whenever the requisite number of tachometer pulses have been counted an INT3 signal is generated causing entry to the INT3 subroutine shown in FIG. 15. As there shown, a counter register NUMTN counts the number of accumulated tenths of units (e.g. tenths of feet since the last sensed charge dot). The second section of the programmable interval timer 844 is reloaded at 1502. The TOTLEN (total length) and LENGTH registers are also incremented as appropriate at 1504. The onset of the time "window" in which a sensed charged dot is to be expected is detected at 1506 (e.g. 35 NUMTN 36) and gate 824 is then enabled before exit. The conclusion of this "window" is detected at 1507 (in the event an INT6 has not already occurred) and an actual corona discharge "start" signal is then forced onto gate 822, the NUMTN counter is reset and the "missing doublet count" is incremented as shown.

Figure 16:
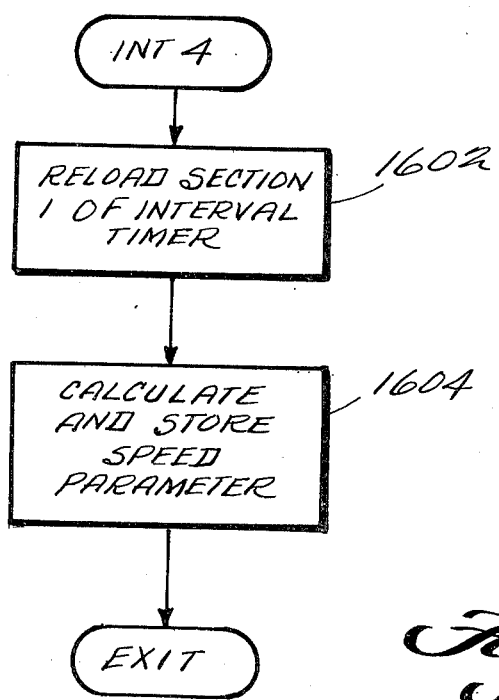

The INT4 subroutine shown in FIG. 16 occurs once each second. The one-second timer (section 1 of the interval timer 844) is reset at 1602 and the speed parameter is calculated and stored (for possible later display or usage) at 1604.

Figure 17:
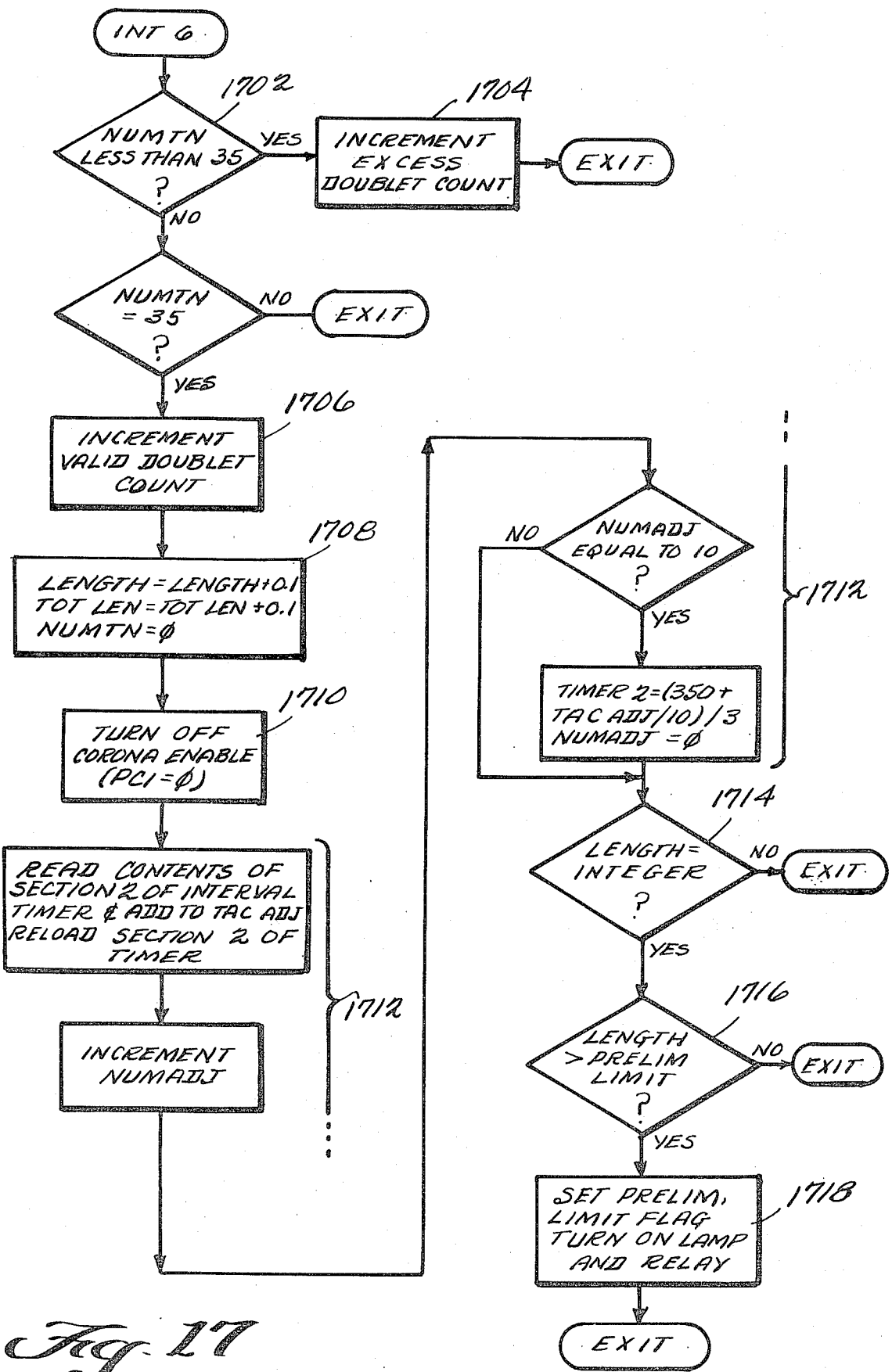

The INT6 subroutine shown in FIG. 17 is entered each time an actual doublet signal occurs. If outside the expected time window (as tested at 1702), the "excess doublet count" register is incremented at 1704. If within the expected time window, the "valid doublet count" register is incremented at 1706. The length and total length registers are incremented appropriately and the NUMTN counter reset at 1708. The corona enable to gate 824 is also turned off at 1710. At 1712, the actual contents of the tachometer pulse counter at this time is sampled and accumulated over 10 cycles before being used to adjust the reseting value (TIME2) for this section of timer 844 so as to correct for tachometer inaccuracy. After each accumulation of a complete unit (e.g. one foot as tested at 1714), the running length measurement is tested against the preset preliminary limit at 1716 and, if appropriate, data flags and operator warning devices are set at 1718 so as to permit automatic or manual slowing of the line as the "final limit" is reached. When such a final limit is reached (as determined by the operator in this embodiment via the front panel display), the "stop count" switch is operated thus causing the termination of a run with the occurrences depicted and already explained with respect to FIG. 13.

Summarizing, the presently preferred embodiment of the length measurement system described above includes a microprocessor based controller providing a continuous count of length display, counter control, operator control and data system interface to an electrostatic mark/sense length gauge. The basic unit consists of an 8 bit 8085 microcomputer with 256 bytes of RAM memory and up to 4096 bytes of EPROM memory. Interfaces to the mark/sense gauge include a trigger and a disable logic to a corona point driver, a tachometer input, and a doublet input from an electrostatic sensor. The unit incorporates an integral control panel for operator display and provides an EIA 20 ma current interface for data systems communications.

The exemplary unit has four modes of display operations as selected by the operator: length, length last run, speed, and totalized length. The microprocessor continuously counts accumulated or total length. Length targets for a specific run can be set from the integral control panel. The microprocessor will also count valid doublets, missing doublets, and excessive doublets. These can be accessed by a maintenance engineer to assess performance of the electrostatic length sensor. An indicator light is provided to the operator to indicate sensor failure.

The integral control panel includes:
1. A display of 8 (for 0.1 foot resolution) digits.
2. Thumbwheel switches are provided for the following operator interfaces:
    a. Four digit preliminary limit—to indicate the number of feet short of the final limit for line slow down and, in the test mode, to set offset—distance from sensor to take up reel or cut location.
    b. Six digit final limit—to indicate cable cut, mark or line stop.
3. Controls are also provided for the following:
    a. Rotary display select (4 position) length, length last run, speed, total length.
    b. Two position switch—count up, count down.
    c. Start count pushbutton.
    d. Stop count pushbutton.
    e. Totalized reset keylock switch.

An EIA 20 ma current loop interface is provided for data system communications of all accumulated counts and control and switch settings. Targets can also be set from the data system unit.

The exemplary unit is controlled by a Model 8055 microprocessor chip coupled with an 8155 RAM I/O timer chip and one or two 8755 EPROM I/O chips. This provides a basic overall microprocessor capability of 256/8 bit words of RAM memory, 2048/8 bit words of EPROM expandable to 4096/8 bit words. It provides a total of 6/8 bit I/O data ports and 1/6 bit data port. The 6 bit data port is employed for data selection and control of the various I/O ports. The 8085 features a basic 0.8 microsecond instruction cycle and includes four featured interrupts, serial in/serial out port and direct memory addressing to 64,000 bytes of memory. The microprocessor system provides the basic counting interface to the electrostatic length sensor. A tachometer input and a doublet input are provided as basic counting inputs. The electrostatic length gauge will provide an electrostatic doublet every three feet. The tachometer provides 1200 pulses per foot or 3600 pulses for every three feet. The microprocessor also provides complete control over the corona point driver by controlling the trigger and disable logic. The receiver doublet input is coupled to a microprocessor interrupt.

The basic tachometer input is coupled to a counter input associated with the 8155. The counter is programmed to develop an interrupt every 120 counts or every 0.1 feet. The interrupt is used to increment and accumulate in RAM memory the counted length. Every thirty six hundred pulses are used to develop a doublet window. This is defined as a tachometer count of 3480 to 3600. During this period the computer looks for a doublet interrupt. If a doublet interrupt occurs the microprocessor lifts the corona point disable and allows the doublet to trigger the corona point driver. The RAM length accumulation counter is also incremented another 0.1 feet. If no doublet occurs, the computer directly triggers the corona point driver and increments the length accumulator counter. A count is also incremented in a RAM missing doublet accumulator.

Doublets occurring outside the 3480 to 3600 window are also counted and stored in a RAM excess doublet accumulator. Dual doublets will also cause the RAM excess doublet accumulator to increment. The following RAM locations are defined as registers for storing accumulated counts:

1. Length for run
2. Length last run
3. Total length since last totalized reset
4. Missing doublets
5. Excessive doublets
6. Valid doublets
7. Missed doublets per 100 feet
8. Excess doublets per 100 feet The microprocessor also stores in RAM the following Control Panel Switch Data:

1. 4 digit preliminary limit
2. 6 digit final limit
3. 4 digit offset
4. Count-up/count-down direction instruction
5. Length/length last run/speed display The microprocessor continually increments the total length as long as cable is in the sensor and the line is running. Counting of total length will continue as long as tachometer pulses are generated. When the operator actuates the start count button the length for run counter register data will be transferred to the length of last run register, the length for run counter register will be reset, new thumbwheel settings will be transferred to the microprocessor and length for a new run will be counted in 0.1 feet increments as defined above.

Under normal conditions when the preliminary limit (number of feet short of the final limit) is reached the preliminary limit light is turned on and the relay for line slow down is actuated. When final limit is reached the cut/mark relay will be actuated for one second, the length of run will be transferred to the length of last run register, the length of run register will be reset and the new thumbwheel limit settings will be transferred to the microprocessor and the count will be repeated.

If the keylock reset switch is actuated, the accumulated total length is displayed flashing at a 0.5 second rate for this 5 seconds and the total RAM control and data registers will be reset. Counting of total length will continue after reset. No length of run counts will be initiated until the start or stop counts buttons are actuated.

When doublet pulses are present and tachometer inputs are not detected the failure light will be actuated. In the count-down mode the length of run register in RAM will be incremented. The data actually displayed is determined by the mode select switch on the control panel. The computer will automatically re-actuate the corona point driver after the line stops in the middle of a run. The line start-up will be detected when tachometer pulses are again counted.

An EIA 20 ma current loop interface is provided for transferring switch settings and accumulated count data to the data system. This data will be transmitted at an internally selectable baud rate with 8 data bits, 1 start bit, 1 stop bit, and 1 parity. Output data transmitted on request includes length, accumulated total length, speed, diagnostic data, length last run, local remote switch position, failure indication, offset, preliminary limit reached and final limit reached. Inputs from the data system include total reset, start count, reset count, set preliminary limit, set final limit, set offset, and data requests.

The exemplary control panel layout is shown in FIG. 6. The control panel includes the following external controls and displays:

FRONT PANEL CONTROLS
Display: 8 Digits
Stop Count: Depressing this pushbutton will reset the microprocessor length of run counter to zero, cause new targets and offset to be set in the microprocessor, and the final limit control relay to be actuated.
Start Count: Identical to stop count except final limit control relay is not actuated.
Totalized Reset: Actuating this key lock switch will display the totalized register flashing at a ½ second rate and reset the totalized register and display register to zero.
Display Mode: This switch has 4 positions:
  Length: Will display the length of a run that has passed thru the sensor since the last start count, stop count, was initiated. Will update once/second.
  Length
  Last Run: Will display the length of last run register from the microprocessor. This will be the length count prior to actuation of start count or stop count buttons.
  Speed: Will display the line speed in feet/min and update once/second.
  Totalized: Will display the totalized length counter from the microprocessor that has accummulated since the last totalized reset action.
Count-up/Count-down: This switch determines the direction of display count.
  Up: Starts at zero and counts up to the target setting and then is automatically reset to zero to count up again.
  Down: The count starts at the target number and counts down to zero. At zero the display is reset to the target number to count down again.
Preliminary Limit: This thumbwheel switch sets the number of feet from the final limit at which a Form "C" relay closure is given and a display lamp will be lit.
Final Limit: This thumbwheel switch sets a length target that is typically larger than the preliminary limit and when the display reaches this number a Form "C" relay closure is given and the display is reset to zero.
Failure Display: This display is lit whenever doublet pulses are detected but no tachometer pulses are present.

Test Display: This display will indicate when the unit is in the test mode.

English/Metric Display: This display shows the displayed units of measurement.

Local/Remote Display: This display indicates from where the length sensor is receiving its operating instructions. In the Local Mode, the front panel controls its operation. In the Remote position, the controls are programmed from a remote source and the front panel switches are inhibited.

Power: This switch turns power off and on for the entire system.

Test/Run Switch: This switch selects the operating mode of the display. In the run position the display operates as previously described. In the test position the display will display data as defined by the test mode display switches and will actuate a test light on the front panel.

Test Mode Display

Switches: These three switches select the following bits of data collected from the last time the total reset switch was depressed:
 A. Missing Doublets
 B. Excessive Doublets
 C. Valid Doublets
 (This information is for sensor diagnostics.)

English/Metric: The fourth position of the above dip switch selects the scaling for the length (Metric or English).

Local/Remote: This is the fifth position of the above dip switch. Local gives operator full use of control panel. Remote gives control to data systems device coupled to EIA 20 ma communications interface. The data systems device will set targets and receive length and control data as requested. The display mode switch can still be used by the operator.

Offset/Preliminary: This switch permits programming of the offset distance (distance from the cutoff location to the take-up reel).

Set Offset: When the test/run switch is in the test mode and the offset/prelim switch is in the offset position depressing this pushbutton will load the front panel 4 digit limit setting into the offset register.

Baud Rate: This switch permits the selection of one or four baud rates (300,1200,2400,9600).

Diagnostics: Lamps will be lit or flashing for normal operation.
 A. CPU flashing
 B. External data requests (on during request)
 C. More than 4 consecutive doublets missing
 D. More than 20 of 100 doublets missing
 E. ±5 volts While only a few specific exemplary embodiments of this nvention have been described in detail, those in the art will recognize that there are many possible modifications and varations of these embodiments which will still incorporate many of the novel and advantageous features of this invention. Accordingly, all such modifications and variations are intended to be included within the scope of the appended claims.

What is claimed is:

1. An electrostatic transducer adapted for a length measurement system used to measure the length of material moving along an intended measurement path said transducer comprising:
  a corona discharge electrode disposed to be out of contact with said material;
  a reference electrode substantially surrounding the intended path of moving material; and
  a charge sensing electrode also substantially surrounding the intended path of moving material and disposed a predetermined distance from said corona discharge electrode, said charge sensing electrode being substantially surrounded by said reference electrode, and both said sensing and reference electrodes also being disposed out of contact with the path of relatively moving material.

2. An electrostatic transducer as in claim 1 wherein said reference electrodes comprise:
  two electrically conductive surfaces which together substantially surround the intended path of relatively moving material but which are spaced out of contact therewith,
  one of said reference electrodes being disposed on one side of said intended path and the other reference electrode being disposed on the other side of the said intended path.

3. An electrostatic transducer as in claim 2 wherein each of said reference electrodes is of substantially greater dimension in the direction of intended material travel than that of said charge sensing electrode.

4. An electrostatic transducer as in claim 1 or 2 wherein said charge sensing electrode is spaced from said reference electrode by a dielectric layer.

5. An electrostatic transducer as in claim 1 wherein said reference and charge sensing electrodes each comprise plural physical pieces which together substantially surround the intended path of moving material.

6. An electrostatic transducer as in claim 1, 2, or 3 further comprising:
  a roller biased for contact with said moving material; and
  a mounting assembly for said corona discharge electrode which is fixed relative to the rotational axis of said roller.

7. An electrostatic transducer adapted for use in a length measurement gauge measuring lengths of elongated material moving along a measurement path, said transducer comprising:
  a metallic tunnel radially surrounding a predetermined axial length of said measurement path;
  said tunnel having a separable top portion which, when opened, permits unobstructed access to the measurement path;
  a corona discharge electrode mounted within said tunnel; and
  a charge sensing electrode mounted within said tunnel at a predetermined axial distance downstream from said corona discharge electrodes.

8. An electrostatic transducer as in claim 7 further comprising:
  a roller mechanically biased for contact with said moving material; and
  a mounting assembly fixed relative to the rotational axis of said roller and connected to dispose said corona discharge electrode at a fixed distance from the surface of said moving material.

9. An electrostatic transducer as in claim 7 wherein said separable top portion of the tunnel is hinged to the remainder of the tunnel.

10. An electrostatic transducer as in claim 7, 8 or 9 wherein said separable top portion of the tunnel is magnetically latched to the remainder of the tunnel during normal operation.

11. An electrostatic transducer as in claim 7, 8 or 9 wherein said charge sensing electrode substantially surrounds said measurement path and further comprising:
an axially elongated reference electrode disposed on each axial side of said charge sensing electrode.

12. An electrostatic transducer as in claim 11 wherein said charge sensing electrode is spaced from said reference electrodes by a dielectric substrate.

13. An electrostatic transducer as in claim 11 further comprising plural separate electrically parallel connected charge sensing and reference electrodes.

14. An electrostatic transducer adapted for use with a mark/sense length measurement gauge measuring the length of material moving along a measurement path, said transducer comprising:
a pointed corona discharge electrode disposed a substantially constant distance out of contact with the path of relatively moving material to be measured;
a reference electrode disposed downstream of said corona discharge electrode,
said reference electrode substantially surrounding the intended path of moving material and having an aperture formed therein; and
a charge sensing electrode also substantially surrounding the intended path of moving material and disposed within said aperture at a predetermined distance from said corona discharge electrode.

15. An electrostatic transducer adapted for use with a mark/sense length measurement gauge measuring the length of material moving along a measurement path, said transducer comprising:
a pointed corona discharge electrode disposed a substantially constant distance out of contact with the path of relatively moving material to be measured;
a reference electrode disposed downstream of said corona discharge electrode,
said reference electrode having an aperture formed therein;
a charge sensing electrode disposed within said aperture at a predetermined distance from said corona discharge electrode
said electrodes substantially surrounding the path of relatively moving material to be measured; and
an elongated tunnel member housing all of said electrodes, said tunnel member having a separable top portion; and
said electrodes also having a separable top portion whereby the material to be measured can be placed into the measurement path without threading an open end therealong.

16. An electrostatic transducer as in claim 15 wherein said separable portion of the tunnel member is hinged at one side to the remainder of said tunnel member.

17. An electrostatic transducer as in claim 15 or 16 wherein said separable portions of the electrodes are physically secured with the separable portion of said tunnel member.

18. An electrostatic transducer as in claim 15 or 16 further comprising:
a mechanical limit sensor which automatically separates said separable portions when contacted by an over-sized object travelling along the measurement path.

19. An electrostatic transducer as in claim 15 or 16 further comprising:
magnetic latch means for normally maintaining said separable portion of the tunnel member in closed contact with the remainder of that member.

20. An electrostatic transducer as in claim 15 or 16 wherein said electrodes are formed of shaped conductive areas separated by a dielectric layer.

21. An electrostatic transducer as in claim 15 or 16 further comprising:
separate respective electrical connections to the separable portion and remaining portion of each of said electrodes.

22. An electrostatic transducer as in claim 15 or 16 wherein said electrodes are of substantially planar configuration extending so as to substantially surround the measurement path.

23. An electrostatic transducer as in claim 15 or 16 wherein said reference electrode comprises a metallic member with said sensing electrode disposed in the aperture formed therein.

24. An electrostatic transducer as in claim 15 or 16 further comprising:
a roller biased for contact with said moving material; and
a mounting assembly for said corona discharge electrode which is fixed relative to the rotational axis of said roller.

25. An electrostatic transducer adapted for use with a mark/sense length measurement gauge measuring the length of material moving along a measurement path, said transducer comprising:
a pointed corona discharge electrode disposed a substantially constant distance out of contact with the path of relatively moving material to be measured; and
a charge sensing electrode disposed a predetermined distance downstream of said corona discharge electrode, said charge sensing electrode substantially surrounding said measurement path.

26. An electrostatic transducer adapted for use with a mark/sense length measurement gauge measuring the length of material moving along a measurement path, said transducer comprising:
a pointed corona discharge electrode disposed a substantially constant distance out of contact with the path of relatively moving material to be measured;
a charge sensing electrode disposed a predetermined distance downstream of said corona discharge electrode, said charge sensing electrode substantially surrounding said measurement path; and
an elongated tunnel member housing all of said electrodes, said tunnel member hoving a separable top portion;
said sensing electrode also having a separable top portion whereby the material to be measured can be placed into the measurement path without threading an open end therealong.

27. An electrostatic transducer as in claim 26 wherein said separable portion of the tunnel member is hinged at one side to the remainder of said tunnel member.

28. An electrostatic transducer as in claim 26 or 27 wherein said separable portions of the sensing electrode are physically secured with the separable portion of said tunnel member.

29. An electrostatic transducer as in claim 26 or 27 further comprising:
a mechanical limit sensor which automatically separates said separable portions when contacted by an over-sized object travelling along the measurement path.

30. An electrostatic transducer as in claim 26 or 27 further comprising:
   magnetic latch means for normally maintaining said separable portion of the tunnel member in closed contact with the remainder of that member.

31. An electrostatic transducer as in claim 26 or 27 further comprising a reference electrode also having corresponding separable portions which respectively substantially surround the separable portions of said sensing electrode and wherein said electrodes are formed of shaped conductive areas separated by a dielectric layer.

32. An electrostatic transducer as in claim 31 further comprising:
   separate respective electrical connections to the separable portion and remaining portion of each of said electrodes.

33. An electrostatic transducer as in claim 31 wherein said electrodes are of substantially planar configuration extending so as to substantially surround the measurement path.

34. An electrostatic transducer as in claim 31 wherein said reference electrode comprises a metallic member with said sensing electrode disposed in an aperture formed therein.

35. An electrostatic transducer as in claim 26 or 27 further comprising:
   a roller biased for contact with said moving material; and
   a mounting assembly for said corona discharge electrode which is fixed relative to the rotational axis of said roller.

36. An electrostatic transducer adapted for a length measurement system used to measure the length of material moving along an intended measurement path said transducer comprising:
   a corona discharge electrode disposed to be out of contact with said material;
   a reference electrode; and
   a charge sensing electrode disposed a predetermined distance from said corona discharge electrode and substantially surrounded by said reference electrode, both said sensing and reference electrodes also being disposed out of contact with the path of relatively moving material,
   said charge sensing and reference electrodes each being physically separable in at least one place to permit easy entry thereinto of the material to be measured.

37. An electrostatic transducer adapted for a length measurement system used to measure the length of material moving along an intended measurement path said transducer comprising:
   a corona discharge eletrode disposed to be out of contact with said material;
   a reference electrode; and
   a charge sensing electrode disposed a predetermined distance from said corona discharge electrode and substantially surrounded by said reference electrode, both said sensing and reference electrodes also being disposed out of contact with the path of relatively moving material,
   said charge sensing and reference electrodes including conductive areas laminated to a dielectric substrate.

* * * * *